(12) United States Patent  
Ohtaka et al.

(10) Patent No.: US 9,407,805 B2  
(45) Date of Patent: Aug. 2, 2016

(54) ELECTRONIC DEVICE WITH A COVER FOR IMAGING

(71) Applicant: CASIO COMPUTER CO., LTD., Shibuya-ku, Tokyo (JP)

(72) Inventors: Masatoshi Ohtaka, Saitama (JP); Masatoshi Maruyama, Tokyo (JP); Yasunori Chiba, Tokyo (JP); Yasuaki Ogawa, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 83 days.

(21) Appl. No.: 13/938,447

(22) Filed: Jul. 10, 2013

(65) Prior Publication Data

US 2014/0028865 A1    Jan. 30, 2014

(30) Foreign Application Priority Data

Jul. 24, 2012 (JP) ................................ 2012-163592  
Dec. 18, 2012 (JP) ................................ 2012-275774

(51) Int. Cl.
| | |
|---|---|
| H04N 5/225 | (2006.01) |
| H04N 5/232 | (2006.01) |
| H04N 1/00 | (2006.01) |
| G06F 1/16 | (2006.01) |

(52) U.S. Cl.  
CPC .......... *H04N 5/23203* (2013.01); *G06F 1/1626* (2013.01); *G06F 1/1677* (2013.01); *G06F 1/1686* (2013.01); *G06F 1/1696* (2013.01); *H04N 1/00127* (2013.01); *G06F 2200/1633* (2013.01); *G06F 2200/1634* (2013.01)

(58) Field of Classification Search  
None  
See application file for complete search history.

(56) References Cited

U.S. PATENT DOCUMENTS

| 5,635,959 | A  * | 6/1997 | Takeuchi et al. ............... 345/179 |
|---|---|---|---|
| 7,113,397 | B2 | 9/2006 | Lee |
| 2004/0228081 | A1 | 11/2004 | Lee |
| 2005/0219372 | A1* | 10/2005 | Watanabe ................ 348/207.99 |
| 2008/0151099 | A1* | 6/2008 | Lin et al. ........................ 348/376 |
| 2008/0151510 | A1* | 6/2008 | Cho et al. ....................... 361/727 |
| 2009/0231483 | A1* | 9/2009 | Seddik et al. .................. 348/373 |
| 2009/0262200 | A1* | 10/2009 | Takabatake et al. ....... 348/207.1 |
| 2009/0262204 | A1* | 10/2009 | Pai et al. ................... 348/207.11 |
| 2009/0323131 | A1* | 12/2009 | Toyoda ......................... 358/448 |

(Continued)

FOREIGN PATENT DOCUMENTS

| JP | 02-043077 | 2/1990 |
|---|---|---|
| JP | 2004-342114 | 12/2004 |
| JP | 2007-127980 | 5/2007 |

(Continued)

OTHER PUBLICATIONS

Japanese Office Action for Japanese Patent Application No. 2012-275774 mailed Aug. 17, 2015.

(Continued)

*Primary Examiner* — Lin Ye  
*Assistant Examiner* — Euel Cowan  
(74) *Attorney, Agent, or Firm* — Amin, Turocy & Watson, LLP

(57) ABSTRACT

An electronic device of the present invention has a flat-type device case whose front surface is provided with an imaging section and which is covered by a foldable cover, and includes an open/close detecting section which detects an open/close angle of the cover when the cover covers the device case, and outputs a detection signal for causing the imaging section to perform imaging.

11 Claims, 16 Drawing Sheets

(56) References Cited

U.S. PATENT DOCUMENTS

2012/0111881 A1* 5/2012 Gaddis et al. ............... 220/752
2012/0223704 A1* 9/2012 Hayashi ...................... 324/244

FOREIGN PATENT DOCUMENTS

| | | |
|---|---|---|
| JP | 2010-075172 | 4/2010 |
| JP | 2010-165215 | 7/2010 |
| JP | 2010-206238 | 9/2010 |
| JP | 2011-055769 | 3/2011 |
| JP | 2011-076267 | 4/2011 |
| JP | 2012-004958 | 1/2012 |

OTHER PUBLICATIONS

Office Action of Notification of Reason(s) for Rejection for Japanese Patent Application No. 2011-192696 dated Aug. 31, 2015, 7 pages.

* cited by examiner

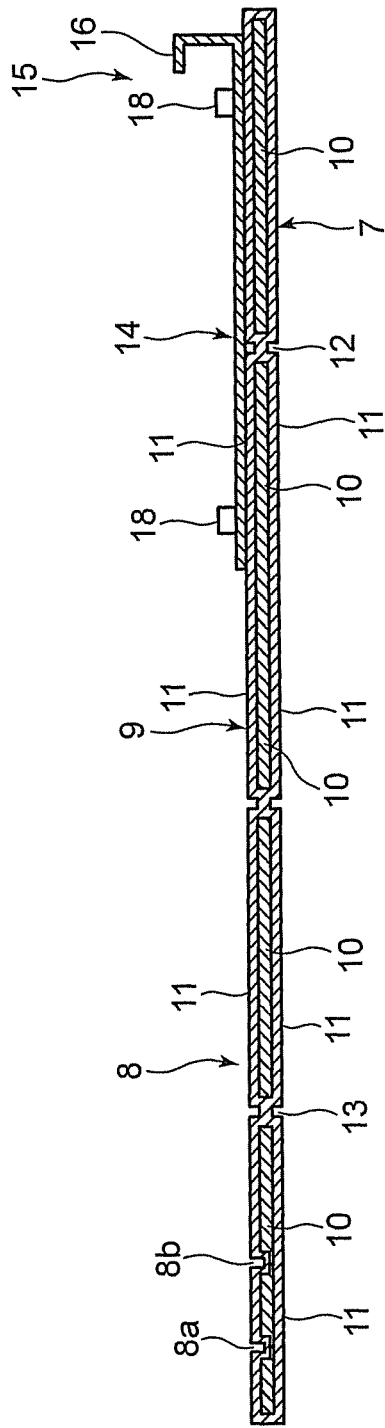
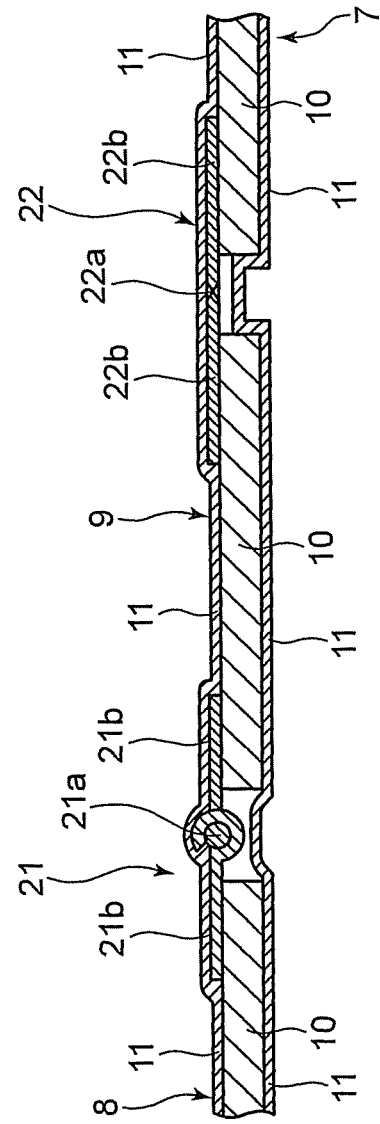

ated to flat-type electronic devices such as portable information terminals." -->

ELECTRONIC DEVICE WITH A COVER FOR IMAGING

CROSS-REFERENCE TO RELATED APPLICATION

This application is based upon and claims the benefit of priority from the prior Japanese Patent Applications No. 2012-163592, filed Jul. 24, 2012 and No. 2012-275774, filed Dec. 18, 2012, the entire contents of which are incorporated herein by reference.

BACKGROUND OF THE INVENTION

1. Field of the Invention

The present invention relates to flat-type electronic devices such as portable information terminals.

2. Description of the Related Art

For example, a flat-type electronic device is known which includes a protective cover for covering and protecting the device case and in which the protective cover has a case cover section for accommodating the device case and a lid cover section rotatably mounted on the case cover section to cover the front surface of the device case, as described in Japanese Patent Application Laid-Open (Kokai) Publication No. 2007-127980.

This type of electronic device is structured such that the lid cover section rotates to openably and closably cover the front surface of the device case with the device case being accommodated in the case cover section of the protective cover formed approximately in a box or frame shape.

In this type of electronic device, an imaging section such as a camera is incorporated in the device case. In a case where a photographic subject such as a business card or a memo is imaged by the imaging section and captured as imaged data, the photographic subject such as a business card or a memo is placed on the lid cover section of the protective cover and then imaged by the imaging section, with the lid cover section tilted in a closing direction.

However, in this type of electronic device where the lid cover section of the protective cover merely closes when it is closed to cover the front surface of the device case, it is difficult to detect the tilt of the lid cover section and keep imaging timing constant when a photographic subject is imaged by the imaging section. Accordingly, there is a problem in that a photographic subject is not accurately and favorably imaged.

SUMMARY OF THE INVENTION

The present invention is to accurately and favorably image a photographic subject by keeping the imaging timing of an imaging section constant.

In accordance with one aspect of the present invention, there is provided an electronic device having a flat-type device case whose front surface is provided with an imaging section and which is covered by a cover that is foldable, comprising: an open/close detecting section which detects an open/close angle of the cover when the cover covers the device case, and outputs a detection signal for causing the imaging section to perform imaging.

According to the present invention, a photographic subject is accurately and favorably imaged by the imaging timing of an imaging section being kept constant.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A and FIG. 4B each depict a cross-section of the protective cover depicted in FIG. 3, of which FIG. 4A is a sectional view of the protective cover taken along line A-A in FIG. 3, and FIG. 4B is an enlarged sectional view of the main portion taken along line B-B in FIG. 3;

FIG. 6A and FIG. 6B depict an engaging section of the device case depicted in FIG. 5, of which FIG. 6A is an enlarged view of the main portion thereof, and FIG. 6B is an enlarged sectional view of the main portion taken along line C-C;

FIG. 7A and FIG. 7B depict a click-feeling providing section depicted in FIG. 2, of which FIG. 7A is an enlarged perspective view thereof and FIG. 7B is an enlarged sectional view of the main portion thereof taken along line D-D;

FIG. 8A to FIG. 8C each depict a use mode of the protective cover depicted in FIG. 2, of which FIG. 8A is a side view depicting the state in which the electronic device is leaned against the protective cover, FIG. 8B is a side view depicting the state in which the protective cover is used as a paper table for recording paper sheets, FIG. 8C is a side view depicting the state in which the electronic device is used with a recording paper sheet interposed between the protective cover and the device case;

DETAILED DESCRIPTION OF THE PREFERRED EMBODIMENTS

<First Embodiment>

A first embodiment in which the present invention has been applied to an electronic device is described below with reference to FIG. 1 to FIG. 8C.

Figure 1:
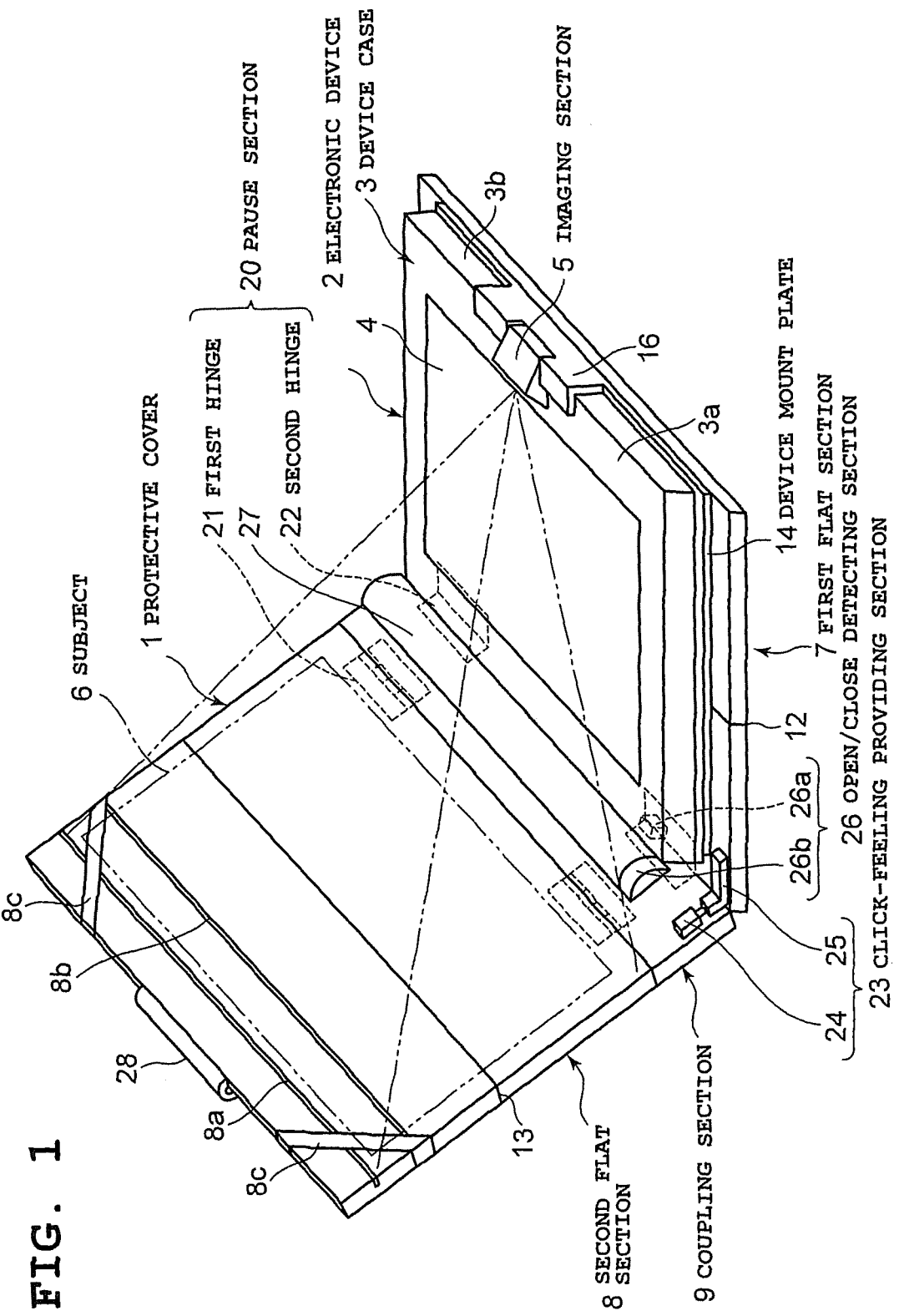
FIG. 1 is a perspective view of a first embodiment in which the present invention has been applied to an electronic device.
Figure 2:
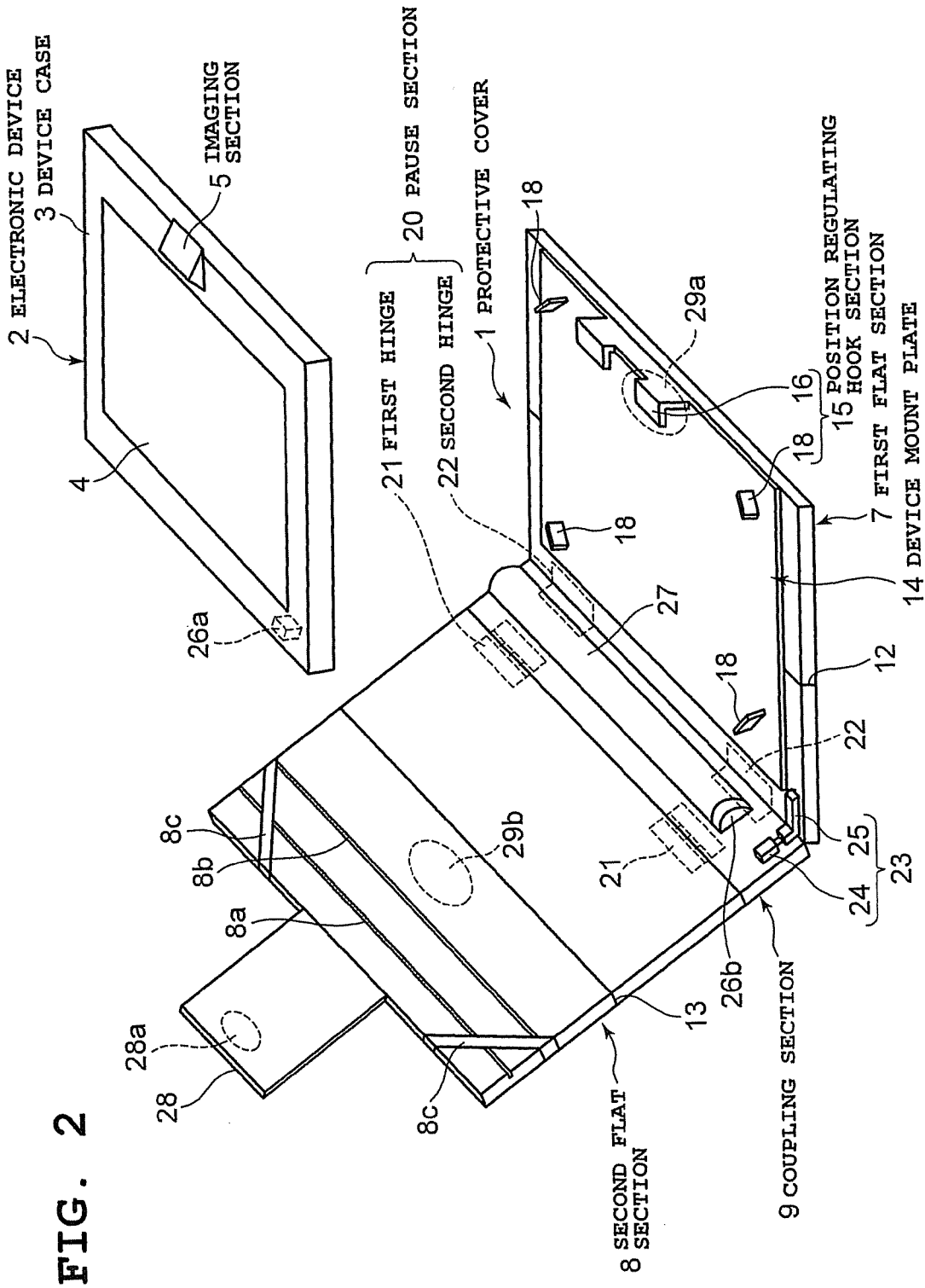
FIG. 2 is a perspective view of the electronic device and a protective cover depicted in FIG. 1 when they are detached.

As depicted in FIG. 1 and FIG. 2, this electric device 2 is structured to be covered and protected by a foldable protective cover 1.

That is, the electronic device 2 is a flat-type tablet terminal device, and includes a flat-plate-shaped device case 3. The device case 3 has a front surface 3a provided with an input display section 4 and an imaging section 5.

As depicted in FIG. 1 and FIG. 2, the input display section 4 is structured by a display panel being placed on the lower surface of a touch panel, and is placed over an approximately entire area of the front surface 3a of the device case 3.

This input display section 4 is structured so that when the touch panel is touched while information displayed on the display panel is being viewed, display contents are switched and other information is inputted.

The imaging section 5 is a digital camera section and, as depicted in FIG. 1 and FIG. 2, is provided at one side portion 3b of the front surface 3a of the device case 3.

That is, as depicted in FIG. 1, the imaging section 5 is structured to image a subject 6 placed on another side portion 3c side of the device case 3 across the input display section 4. In this case, the subject 6 is, for example, a business card or a writing paper sheet containing a memo.

On the other hand, the protective cover 1 included a first flat section 7 where the back surface 3d of the electronic device 2 is placed, a second flat section 8 which openably and closably covers the front surface 3a of the electronic device 2, and a coupling section 9 which foldably couples the first flat section 7 and the second flat section 8 together.

As depicted in FIG. 4A and FIG. 4B, the first flat section 7, the second flat section 8, and the coupling section 9 are each structured by an intermediate plate 10 made of synthetic resin and a cover sheet 11 covering the intermediate plate 10.

That is, the intermediate plate 10 is made of hard synthetic resin such as polypropylene, and is formed for each of the first flat section 7, the second flat section 8, and the coupling section 9 independently.

The cover sheet 11 is made of synthetic leather, natural leather, soft synthetic resin, or the like, and is formed to cover along the intermediate plates 10 of the first flat section 7, the second flat section 8, and the coupling section 9.

Figure 3:
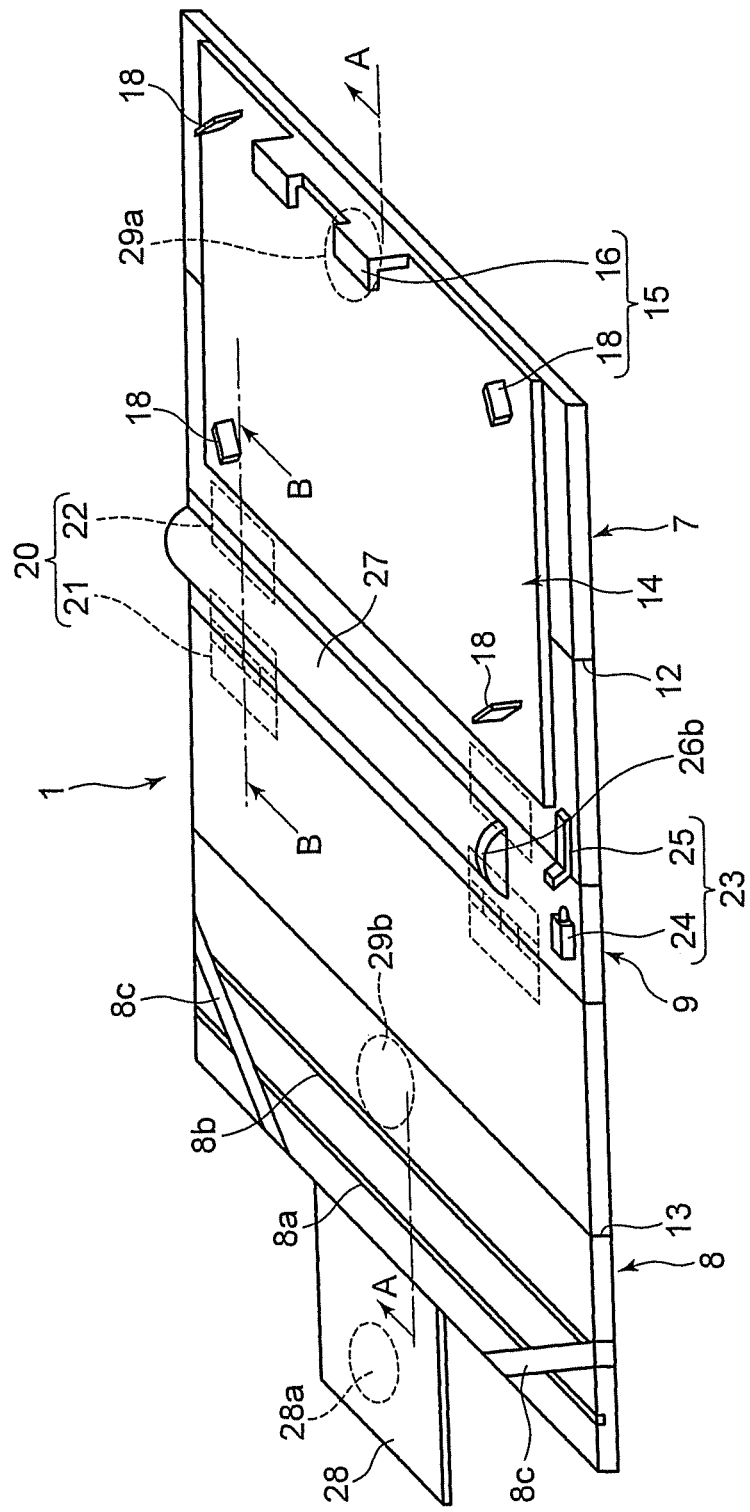
FIG. 3 is a plan view of the protective cover depicted in FIG. 2 when it is unfolded and developed.

As a result, as depicted in FIG. 3, FIG. 4A, and FIG. 4B, the protective cover 1 is structured to be foldable at a portion between the first flat section 7 and the coupling section 9 coupled together and a portion between the second flat section 8 and the coupling section 9 coupled together via the cover sheet 11.

Here, a first folding section 12 is provided at a middle portion of the first flat section 7 in parallel with a folding direction relative to the coupling section 9, and a second folding section 12 is also provided at a middle portion of the second flat section 8 in parallel with the folding direction relative to the coupling section 9.

Accordingly, as depicted in FIG. 4A and FIG. 4B, the first flat section 7 is structured such that the intermediate plate 10 is divided into left and right sides with the first folding section 12 as a boundary, and the portions obtained by the division are coupled together such that the first flat section 7 can be folded via the cover sheet 11.

Similarly, the second flat section 8 is structured such that the intermediate plate 10 is divided into left and right sides with the second folding section 13 as a boundary, and the portions obtained by the division are coupled together such that the second flat section 8 can be folded via the cover sheet 11.

Here, as depicted in FIG. 1 to FIG. 4B, the first flat section 7 is formed to have an area slightly larger than that of the back surface 3d of the electronic device 2.

The second flat section 8 is formed to have an area slightly larger than that of the front surface 3a of the electronic device 2 and dimensions approximately equal to those of the first flat section 7.

On a portion of the second flat section 8 located opposite to the coupling section 9 and away from the second folding section 13, a first position regulating groove 8a and a second position regulating groove 8b are provided in a manner to be a predetermined distance away from each other and in parallel with the coupling section 9.

The coupling section 9 is formed to have an area slightly larger than that of a side surface portion of the electronic device 2.

As depicted in FIG. 2 to FIG. 4B, the first flat section 7 is provided with a device mount plate 14 where the electronic device 2 is removably mounted.

Here, the device mount plate 14 is formed to have dimensions approximately equal to those of the back surface 3d of the device case 3. The device mount plate 14 is mounted on only a half of the first flat section 7 located opposite to the coupling section 9 with the first folding section 12 as a boundary.

As depicted in FIG. 2 to FIG. 4B, the device mount plate 14 is provided with a position regulating hook section 15 which regulates amount position of the electronic device 2 by being removably engaged with the electronic device 2.

The position regulating hook section 15 includes paired pinching hooks 16 which pinch the one side portion 3b of the device case 3 positioned opposite to the coupling section 9, or in other words, the one side portion 3b of the device case 3 where the imaging section 5 is positioned, and a plurality of engaging hooks 18 which removably engage with engaging sections 17 provided at four corners of the back surface 3d of the device case 3.

As depicted in FIG. 2 to FIG. 4B, the paired pinching hooks 16 are structured to abut on both side portions of the imaging section 5 and the one side portion 3b of the device case 3 when pinching the one side portion 3b of the device case 3 positioned on both sides of the imaging section 5, and thereby regulate the mount position of the device case 3 with respect to the device mount plate 14.

Figure 5:
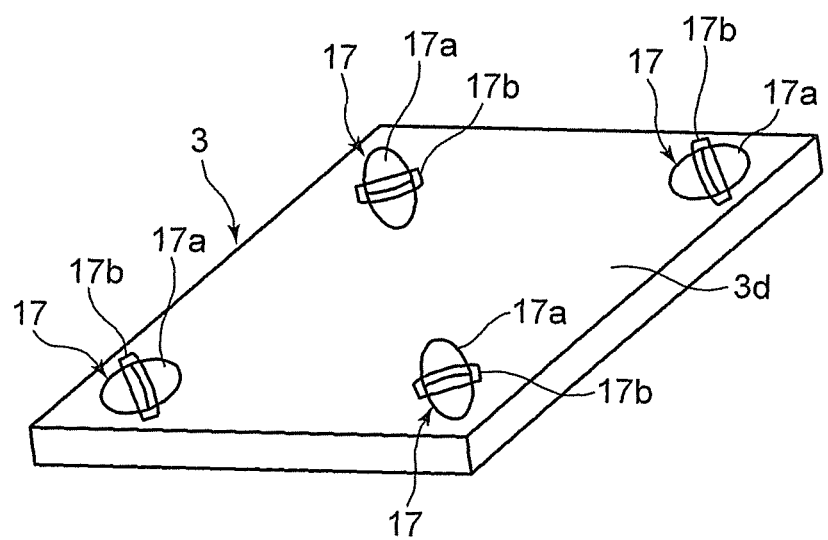
FIG. 5 is a perspective view of the back surface side of the electronic device depicted in FIG. 2.
Figure 6A:
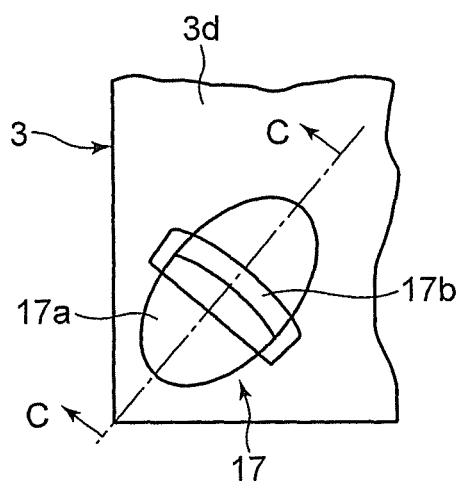
Figure 6B:
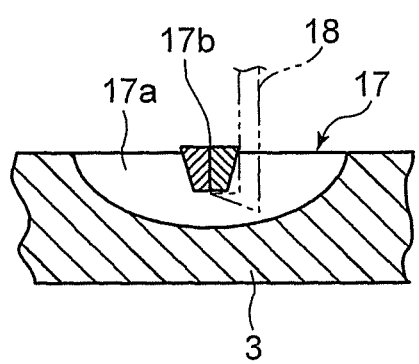

Here, as depicted in FIG. 5, FIG. 6A and FIG. 6B, the engaging sections 17 of the device case 3 have recesses 17a provided on four corners of the back surface 3d of the device case 3 and engaging bridge sections 17b provided in the respective recesses 17a.

Each recess 17a is formed in an approximately oval cone shape elongated from the corner of the device case 3 toward the center, and each engaging bridge section 17b is placed over an area where the oval is divided into two in a longitudinal direction.

As a result, each engaging section 17 of the device case 3 is structured such that the engaging hook 18 of the device case 3 is removably engaged with the engaging bridge section 17b, and a band (not shown) is attached to the device case 3 by being inserted in a space between the bottom of the recess 17a and the lower surface of the engaging bridge section 17b, whereby the device case 3 can be carried, as depicted in FIG. 5, FIG. 6A, and FIG. 6B.

As such, as depicted in FIG. 5, FIG. 6A and FIG. 6B, the position regulating hook section 15 is structured such that the paired pinching hooks 16 pinch the one side portion 3b of the device case 3 where the imaging section 5 of the device case 3 is positioned so as to regulate the mount position of the device case 3 with respect to the device mount plate 14. In this state, when the device case 3 is pushed to the device mount plate 14, the engaging hooks 18 are removably engaged with the engaging sections 17 of the device case 3, and thereby mount the device case 3 on the device mount plate 14.

As depicted in FIG. 1 and FIG. 2, the electronic device 2 includes a pause section 20 which regulates a closing movement of the second flat section 8 when the second flat section 8 is tilted at a predetermined angle θ with respect to the first flat section 7 so as to cover the front surface 3a of the electronic device 2.

Note that the predetermined angle θ of the second flat section 8 in association with the pause section 20 is, for example, in a range of 45 degrees to 90 degrees, and is preferably about 60 degrees.

As depicted in FIG. 3, FIG. 4A and FIG. 4B, the pause section 20 includes a first hinge 21 which rotates by a rotating force equal to or more than a predetermined rotating force and a second hinge 22 which rotates by a rotating force less than the predetermined rotating force.

The first hinge 21 is a torque hinge, and is mounted across the intermediate plate 10 of the second flat section 8 and the intermediate plate 10 of the coupling section 9.

That is, in the first hinge 21, paired mount pieces 21b are rotatably mounted on a hinge shaft 21a, as depicted in FIG. 4B. With the hinge shaft 21a being placed between the intermediate plate 10 of the second flat section 8 and the intermediate plate 10 of the coupling section 9, one of the mount pieces 21b is mounted on the intermediate plate 10 of the second flat section 8 and the other mount piece 21b is mounted on the intermediate plate 10 of the coupling section 9.

Here, as depicted in FIG. 4B, the first hinge 21 is structured such that, by a predetermined load being exerted when the paired mount pieces 21b rotate about the hinge shaft 21a, the paired mount pieces 21b rotate about the hinge shaft 21a by the rotating force equal to or more than the predetermined rotating force.

As depicted in FIG. 4B, the second hinge 22 is made of synthetic resin, and is structured such that the paired mount pieces 22b integrally coupled are foldable by a folding section 22a equivalent to a hinge shaft.

That is, the second hinge 22 is structured such that, with the folding section 22a being placed between the intermediate plate 10 of the first flat section 7 and the intermediate plate 10 of the coupling section 9, one of the mount pieces 22b is mounted on the intermediate plate 10 of the first flat section 7 and the other mount piece 22b is mounted on the intermediate plate 10 of the coupling section 9.

Here, as depicted in FIG. 4B, the folding section 22a is formed between the paired mount pieces 22b such that the thickness thereof is thinner than the thickness of each mount piece 22b.

As a result, the second hinge 22 is structured such that, when the paired mount pieces 22b rotate around the folding section 22a by the folding section 22a being folded, the paired mount pieces 22b rotate around the folding section 22a by a rotating force less than the predetermined rotating force, that is, a rotating force which rarely causes a load.

As a result, the pause section 20 is structured to, when the second flat section 8 is to cover the front surface 3a of the electronic device 2, cause the second flat section 8 to rotate together with the coupling section 9 around the second hinge 22 with respect to the first flat section 7, pause the second flat section 8 at the predetermined tilt angle θ, and then cause the second flat section 8 to rotate around the first hinge 21 with respect to the coupling section 9, as depicted in FIG. 1 to FIG. 4A and FIG. 4B.

As depicted in FIG. 1 and FIG. 2, the electronic device 2 includes a click-feeling providing section 23 which provides a click-feeling to the second flat section 8 when the second flat section 8 is paused at the predetermined tilt angle θ with respect to the first flat section 7.

Figure 7A:
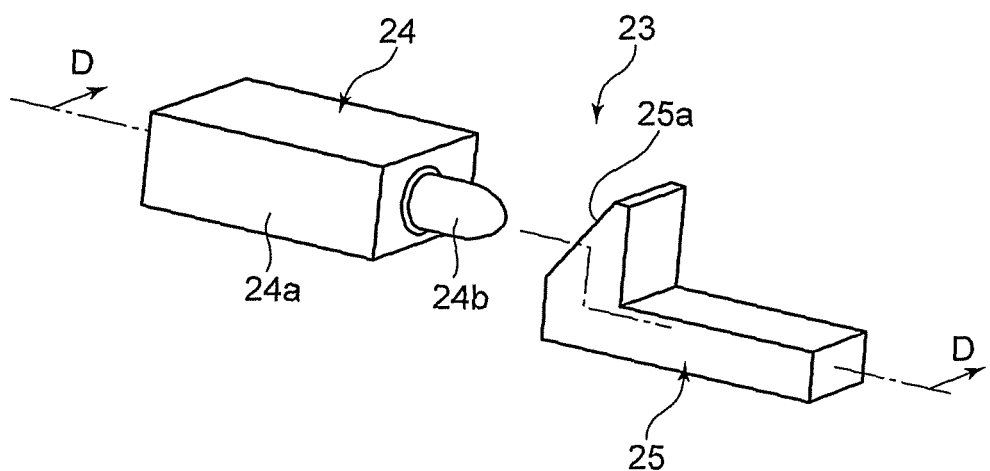
Figure 7B:
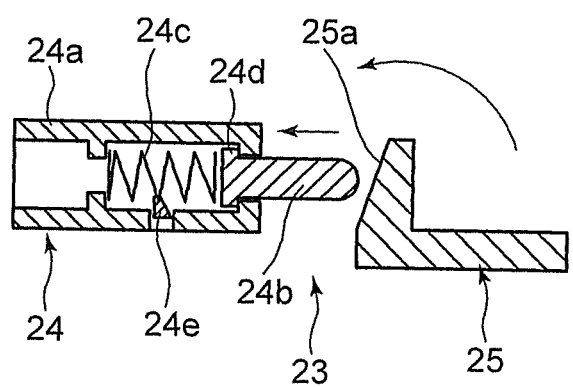

This click-feeling providing section 23 includes a click body 24 and an arm section 25, as depicted in FIG. 7A and FIG. 7B.

The click body 24 is structured such that a sliding section 24b placed in a body section 24a provided on the coupling section 9 is retractable by the spring force of a coil spring 24c, as depicted in FIG. 7A, and FIG. 7B.

The arm section 25 is provided to the first flat section 7, and is structured such that, when the second flat section 8 rotates with the coupling section 9 to the predetermined tilt angle θ relative to the first flat section 7, a tilt section 25a at the tip pushes the sliding section 24b into the body section 24a.

Here, as depicted in FIG. 7A and FIG. 7B, the click body 24 is structured such that, when the sliding section 24b is pushed by the arm section 25 into the body section 24, a collar section 24d of the sliding section 24b overshoots a projection 24e in the body section 24a, and thereby provides a click feeling.

As depicted in FIG. 1, the electronic device 2 is structured such that an open/close angle of the protective cover 1 is detected by an open/close detecting section 26 when the protective cover 1 covers the device case 3.

This open/close detecting section 26 includes a detection element 26a provided on the device case 3, and a detection target section 26b which is provided on the protective cover 1 and can move toward or away from the detection element 26a of the device case 3 in accordance with an opening/closing movement of the protective cover 1.

The detection element 26a is a magnetic sensor such as a Hall element which detects a magnetic field, and provided on a side surface inside the device case 3 corresponding to the coupling section 9 of the protective cover 1, as depicted in FIG. 1 and FIG. 2. This detection element 26a is structured to output an electric signal for causing the imaging section 5 to perform imaging as a detection signal when detecting magnetism.

The detection target section 26b is a magnet, and provided on the coupling section 9 of the protective cover 1 corresponding to the side surface of the device case 3. This detection target section 26b is structured to be able to move toward or away from the detection element 26a of the device case 3 in accordance with an opening/closing movement of the protective cover 1.

As a result, the open/close detecting section 26 is structured such that, when the second flat section 8 is tilted to the predetermined angle θ with respect to the first flat section 7 and paused, the detection element 26a detects the detection target section 26b and outputs an electric signal for causing the imaging section 5 to perform imaging as a detection signal, as depicted in FIG. 1 and FIG. 2.

Here, as depicted in FIG. 1 to FIG. 3, the coupling section 9 of the protective cover 1 corresponding to the side surface portion 3c of the device case 3 is provided with a pen holder section 27 for removably accommodating a touch pen (not shown).

This pen holder section 27 is formed in an approximately semi-cylindrical shape, and structured such that one end (upper side portion in FIG. 3) is open. In the pen holder section 27, the detection target section 26b of the open/close detecting section 26 is provided such that it can move toward or away from the detection element 26a of the device case 3.

As depicted in FIG. 3, a case stop section 28 is provided on one side portion of the second flat section 8 of the protective cover 1 opposite to the coupling section 9.

This case stop section 28 is formed in a flexible tongue shape, and has a flat-plate-shaped magnet 28a provided in its tip portion.

As a result, the case stop section 28 is structured to be attached to a magnetic plate 29a in the first flat section 7 when the tip portion is folded to be placed below the lower surface of the first flat section 7.

The case stop section 28 is also structured to be attached to a magnetic plate 29b in the second flat section 8 when the tip portion is folded to be placed above the upper surface of the second flat section 8.

Also, paired corner bands 8c for temporarily holding a writing paper sheet as the subject 6 are provided at corners on both sides of the side portion of the second flat section 8 opposite to the coupling section 9.

Next, the operation of the electronic device 2 is described.

First, the mounting of the electronic device 2 onto the protective cover 1 is described. In this case, the protective cover 1 is unfolded and developed, and the back surface 3d of the device case 3 is placed corresponding to the device mount plate 14 provided on the first flat section 7 of the protective cover 1.

In this state, the device case 3 is mounted on the device mount plate 14 by the position regulating hook section 15.

Here, the one side portion 3b of the device case 3 where the imaging section 5 of the device case 3 is located is pinched between the paired pinching hooks 16 of the position regulating hook section 15, and thereby regulates the mount position of the device case 3 relative to the device mount plate 14.

In this state, by the device case 3 being pushed onto the device mount plate 14, the engaging hooks 18 are removably engaged with the engaging sections 17 of the device case 3, whereby the device case 3 is mounted on the device mount plate 14.

Then, when the electronic device 2 is to be carried, the protective cover 1 is folded at the coupling section 9 to cause the second flat section 8 to be arranged on the front surface 3a of the device case 3.

Here, firstly, the second flat section 8 and the coupling section 9 rotate around the second hinge 22 with respect to the first flat section 7. Then, when the second flat section 8 is tilted to the predetermined angle θ relative to the first flat section 7, the closing movement of the second flat section 8 is paused by the pause section 20, and the click-feeling providing section 23 provides a click feeling to the second flat section 8.

That is, when the second flat section 8 is to cover the front surface 3a of the electronic device 2, if the second flat section 8 rotates together with the coupling section 9 with respect to the first flat section 7 about the second hinge 22 rotating by the rotating force less than the predetermined rotating force, and is tilted to the predetermined angle θ relative to the first flat section 7, the rotating force of the second flat section 8 is slowed by the rotating force of the first hinge 21, and the pause section 20 pauses the rotation of the second flat section 8 and the coupling section 9 around the second hinge 22.

When the second flat section 8 is tilted to the predetermined angle θ relative to the first flat section 7, the sliding section 24b of the click body 24 is pushed by the arm section 25 provided on the first flat section 7 into the body section 24a against the spring force of the coil spring 24c, and the collar section 24d of the sliding section 24b overshoots the projection 24e in the body section 24a, whereby the click-feeling providing section 23 provides a click feeling.

Then, when the second flat section 8 is rotated by a rotating force equal to or more than the predetermined rotating force, this time, the second flat section 8 rotates around the first hinge 21 with respect to the coupling section 9.

With this, the coupling section 9 corresponds to and covers the side surface portion 3c of the device case 3, and the second flat section 8 corresponds to and covers the front surface 3a of the device case 3.

In this state, the case stop section 28 provided on the one side portion of the second flat section 8 is folded so that the tip portion thereof is placed below the lower surface of the first flat section 7.

Then, the magnet 28a in the tip of the case stop section 28 is attached to the magnetic plate 29a in the first flat section 7. As a result, second flat section 8 is prevented from being inadvertently opened, and the electronic device 2 is favorably protected by the protective cover 1 when it is carried.

Next, use of the electronic device 2 is described.

In this case, firstly, the case stop section 28 is detached from the lower surface of the first flat section 7 against an attachment force between the magnet 28a of the case stop section 28 provided to the one side portion of the second flat section 8 and the magnet plate 29a in the first flat section 7.

Then, the case stop section 28 is unfolded to be placed on the back surface of the second flat section 8, and the magnet 28a inside the tip portion of the case stop section 28 is attached to the magnet plate 29b in the second flat section 8.

In this state, the second flat section 8 is opened to expose the front surface 3a of the device case 3.

Here, the second flat section 8 rotates together with the coupling section 9 about the second hinge 22 to be opened at 180 degrees, and exposes the input display section 4 of the device case 3.

In this state, by the input display section 4 being touched while information displayed thereon is being viewed, display content can be switched and other information can be inputted.

Here, in a case where the electronic device 2 is operated by being held with one hand, the second flat section 8 is further rotated by 180 degrees around the second hinge 22 so as to overlap with the lower surface of the first flat section 7.

In this state, by the device case 3 and the second flat section 8 being held with one hand to be pinched and the input display section 4 of the device case 3 being touched, the electronic device 2 can be favorably used.

Figure 8A:
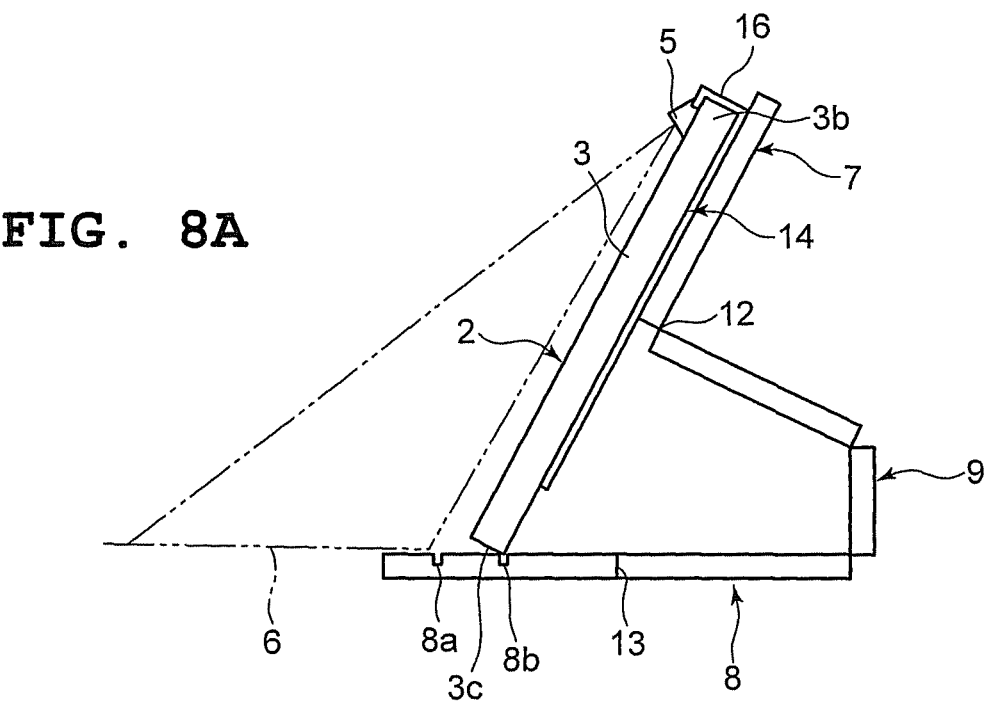

In a case where the electronic device 2 is leaned against the protective cover 1 and used, the protective cover 1 is first unfolded and developed on a plane, and the first flat section 7 is rotated around the second hinge 22 with respect to the second flat section 8 so as to stand upright, as depicted in FIG. 8A.

Then, the standing first flat section 7 is folded at the first folding section 12 so as to project toward the rear of the device case 3. As a result, the imaging section 5 of the device case 3 is positioned above, and the side surface portion 3c below the device case 3 positioned opposite thereto is placed above the second flat section 8. In this state, the device case 3 is diagonally tilted to be leaned against the protective cover 1.

Here, an edge of the side surface portion 3c positioned below the device case 3 is engaged with either one of the first position regulating groove 8a and the second position regulating groove 8b provided on the second flat section 8 selectively, whereby the tilt angle of the device case 3 is adjusted.

For example, when the edge of the side surface portion 3c positioned below the device case 3 is engaged with the first position regulating groove 8a of the second flat section 8, the tilt of the device case 3 is slight.

Also, when the edge of the side surface portion 3c positioned below the device case 3 is engaged with the second position regulating groove 8b of the second flat section 8, the tilt of the device case 3 is steep. Moreover, when the edge of the side surface portion 3c positioned below the device case 3 is placed on the upper surface of the second flat section 8 positioned on the coupling section 9 side of the second position regulating groove 8b, the device case 3 is leaned at a steeper angle.

Figure 8B:
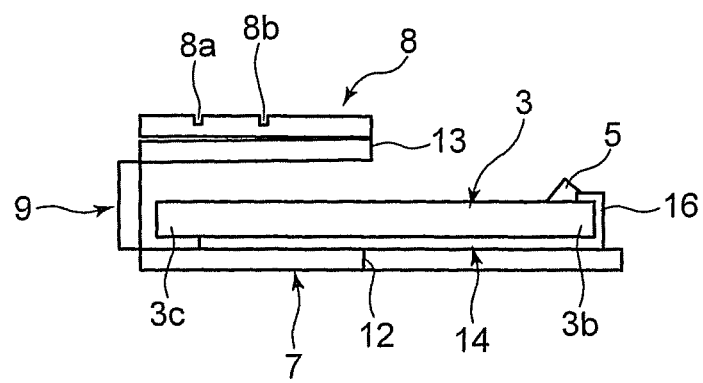

In a case where a memo is required to be written on a recording paper sheet such as a writing paper sheet as the subject 6 while the electronic device 2 is being held with one hand, the second flat section 8 is folded at the second folding section 13 with the device case 3 being covered and protected by the protective cover 1, as depicted in FIG. 8B. Then, the second flat section 8 is folded into two, and the folded portions are overlapped with each other.

In this state, the electronic device 2 is held with one hand together with the protective cover 1, and the recording paper sheet such as a writing paper sheet is placed on the uppermost surface of the overlapping portions of the second flat section 8. As a result, a memo can be written.

Figure 8C:
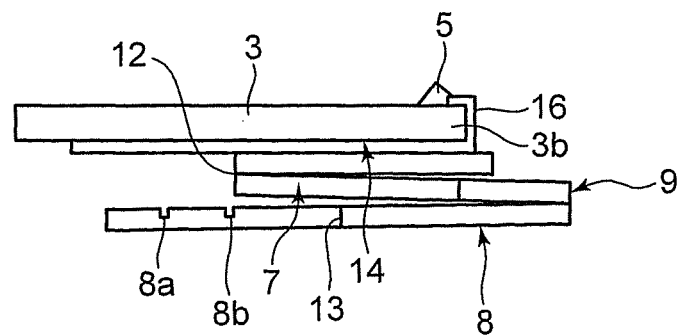

Also, in a case where a touch operation is required to be performed on the input display section 4 while a recording paper sheet containing a memo is being viewed, the protective cover 1 is once unfolded and developed on a plane. In this state, the first flat section 7 is rotated around the second hinge 22, and folded at the first folding section 12 downward relative to the device case 3, and the folded portions are overlapped with each other, as depicted in FIG. 8C.

Then, since the second flat section 8 is overlapped below the device case 3, a recording paper sheet is interposed between the second flat section 8 and a half of the first flat section 7 folded and positioned below, and partially projected from the device case 3. Accordingly, a touch operation can be performed on the input display section 4 of the device case 3 while the memo written in the projected recording paper sheet is being viewed.

Next, imaging of the subject 6, such as a memo or a business card recorded on a recording paper sheet, by the imaging section 5 is described.

Firstly, in a state where the device case 3 is mounted on the device mount plate 14 on the first flat section 7 of the protective cover 1, the electronic device 2 is set at an imaging mode so that imaging by the imaging section 5 can be performed.

Then, the protective cover 1 is unfolded and developed on a plane, and the subject 6 is placed on the second flat section 8 of the developed protective cover 1. Here, the subject 6 is fixed by being inserted below the corner bands 8c of the second flat section 8.

In this state, as depicted in FIG. 1, the second flat section 8 is rotated together with the coupling section 9 around the second hinge 22 so as to be tilted toward the front surface 3a of the device case 3.

Here, the second flat section 8 rotates around the second hinge 22 and, when the second flat section 8 is tilted to the predetermined angle $\theta$ with respect to the first flat section 7, the closing movement of the second flat section 8 is paused by the pause section 20, and the click-feeling providing section 23 provides a click feeling to the second flat section 8.

Here, the open/close detecting section 26 detects an open/close angle of the second flat section 8.

That is, in the open/close detecting section 26, when the second flat section 8 is tilted to the predetermined angle $\theta$ with respect to the first flat section 7, the detection target section 26b that is the magnet provided in the protective cover 1 is brought closer to the detection element 26a that is the magnetic sensor such as a Hall element provided in the device case 3, and the detection element 26a detects a magnetic field of the detection target section 26b and outputs an electric signal for causing the imaging section 5 to perform imaging.

As a result, the subject 6 such as a recording paper sheet containing a memo or a business card is imaged by the imaging section 5.

Note that the present invention is not limited thereto, and the subject 6 can be imaged even when, for example, the electronic device 2 is leaned against the protective cover 1.

In this case, as depicted in FIG. 8A, the first flat section 7 is rotated around the first hinge 21 to stand upright, and the standing first flat section 7 is folded at the first folding section 12 so as to project toward the rear of the device case 3.

With this, as depicted in FIG. 8A, the device case 3 is diagonally tilted and leaned against the protective cover 1. In this state, the subject 6 such as a recording paper sheet containing a memo or a business card is placed in front of the electronic device 2, and a switch for imaging (not shown) is turned ON. As a result, the subject 6 can be imaged by the imaging section 5.

As such, in this electronic device 2, the flat-type device case 3 having the front surface 3a provided with the imaging section 5 is covered by the foldable protective cover 1. The electronic device 2 includes the open/close detecting section 26 which detects an open/close angle of the protective cover 1 when the protective cover 1 covers the device case 3, and outputs a detection signal for causing the imaging section 5 to perform imaging. As a result, imaging timing of the imaging section 5 is kept constant and whereby imaging is accurately and favorably performed.

That is, in this electronic device 2, an open/close angle of the protective cover 1 can be detected by the open/close detecting section 26 when the protective cover 1 covers the device case 3. Then, based on a detection signal detected by the open/close detecting section 26, imaging timing of the imaging section 5 of the device case 3 can be kept constant. As a result of this configuration, the subject 6 placed at a position on the protective cover 1 covering the front surface 3a of the device case 3 can be accurately and favorably imaged.

In this case, the open/close detecting section 26 includes the detection element 26a provided to the device case 3, which is a magnetic sensor such as a Hall element for detecting a magnetic field, and the detection target section 26b provided to the protective cover 1, which is a magnet that can move toward or away from the device case 3 in accordance with an opening/closing movement of the protective cover 1. Therefore, when the second flat section 8 of the protective cover 1 is tilted with respect to the first flat section 7 of the protective cover 1, the detection target section 26b provided to the protective cover 1 can be brought closer to the detection element 26a provided to the device case 3.

Accordingly, the detection element 26a can detect the magnetic field of the detection target section 26b and output an electric signal for causing the imaging section 5 to perform imaging as a detection signal. Then, based on a detection signal detected by the detection element 26a, imaging timing of the imaging section 5 of the device case 3 can be kept constant. As a result of this configuration, the subject 6 placed on the second flat section 8 of the protective cover 1 covering the front surface 3a of the device case 3 can be accurately and favorably imaged.

Also, in the electronic device 2, the coupling section 9 of the protective cover 1 corresponding to the side surface portion 3c of the device case 3 is provided with the pen holder section 27, and the pen holder section 27 is provided with the detection target section 26b of the open/close detecting section 26. Accordingly, the detection target section 26b, which is a magnet, can be easily provided to the protective cover 1. In addition, since the pen holder section 27 is provided to the coupling section 9 of the protective cover 1, the pen holder section 27 can be provided to the protective cover 1 compactly.

Moreover, in the electronic device 2, the protective cover 1, which foldably covers the flat-type electronic device 2 having the front surface 3a provided with the imaging section 5, includes the first flat section 7 where the back surface 3d of the electronic device 2 is placed, the second flat section 8 which openably and closably covers the front surface 3a of the electronic device 2, the coupling section 9 which foldably couples the first flat section 7 and the second flat section 8 together, and the pause section 20 which, when the second flat section 8 is tilted to the predetermined angle θ relative to the first flat section 7 for covering the front surface 3a of the electronic device 2, pauses the closing movement of the second flat section 8. As a result of this structure, imaging timing of the imaging section 5 of the device case 3 is ensured and whereby imaging is accurately and favorably performed.

That is, in the electronic device 2, the second flat section 8 can be paused by the pause section 20 at the predetermined tilt angle θ when the front surface 3a of the electronic device 2 placed on the first flat section 7 is covered by the second flat section 8. Therefore, imaging timing of the imaging section 5 of the device case 3 can be ensured. As a result of this structure, the open/close state of the protective cover 1 can be accurately detected by the open/close detecting section 26 with sufficient leeway, whereby the subject 6 such as a recording paper sheet or a business card placed on the second flat section 8 can be accurately and favorably imaged always in a predetermined state.

In this case, the pause section 20 includes the first hinge 21 which rotates by a rotating force equal to or more than a predetermined rotating force and the second hinge 22 which rotates by a rotating force less than the predetermined rotating force. Accordingly, when covering the front surface 3a of the electronic device 2, the second flat section 8 is rotated around the second hinge 22 with respect to the first flat section 7, paused at the predetermined tilt angle θ, and then rotated around the first hinge 21 with respect to the first flat section 7.

That is, by the first hinge 21 being mounted on the second flat section 8 and the coupling section 9, and the second hinge 22 being mounted on the first flat section 7 and the coupling section 9, when covering the front surface 3a of the electronic device 2, the second flat section 8 rotates with the coupling section 9 with respect to the first flat section 7 around the second hinge 22 which rotates by the rotating force less than the predetermined rotating force. When the second flat section 8 is tilted to the predetermined angle θ with respect to the first flat section 7, the rotation of the second flat section 8 is abruptly slowed by the rotating force of the first hinge 21, whereby the pause section 20 pauses the rotation of the second flat section 8 and the coupling section 9.

Also, when the second flat section 8 is tilted to the predetermined angle θ with respect to the first flat section 7, and the second flat section 8 is rotated by a rotating force equal to or more than the predetermined rotating force, this time, the second flat section 8 can be rotated around the first hinge 21 with respect to the coupling section 9. Accordingly, it is possible to cover the side surface portion 3c of the device case 3 with the coupling section 9 corresponding to the side surface portion 3c of the device case 3, and also cover the front surface 3a of the device case 3 with the second flat section 8 corresponding to the front surface 3a of the device case 3.

Moreover, the pause section 20 includes the click-feeling providing section 23 which provides a click feeling to the second flat section 8 when pausing the second flat section 8 at the predetermined angle θ with respect to the first flat section 7. Accordingly, by the click feeling by the click-feeling providing section 23, it is possible to confirm that the second flat section 8 has been tilted to the predetermined angle θ with respect to the first flat section 7.

As a result, imaging timing of the imaging section 5 can be known accurately. Therefore, the subject 6 such as a recording paper sheet or a business card placed on the second flat section 8 can be uniformly imaged always in a predetermined state. Also, even when there is a foreign substance between the first flat section 7 and the second flat section 8 and the rotating force is reduced, it can be determined that the second flat section 8 has not been tilted to the predetermined angle θ with respect to the first flat section 7 if no click feeling is present.

That is, in the click-feeling providing section 23, when the second flat section 8 is tilted to the predetermined angle θ with respect to the first flat section 7, the sliding section 24b of the click body 24 is pushed by the arm section 25 provided to the first flat section 7 into the body section 24a against the spring force of the coil spring 24c, and the collar section 24d of the sliding section 24b overshoots the projection 24e in the body section 24a, whereby a click feeling is provided. Accordingly, by the click feeling by the click-feeling providing section 23, imaging timing of the imaging section 5 can be accurately and reliably known.

<Second Embodiment>

Next, a second embodiment in which the present invention has been applied to an electronic device is described with reference to FIG. 9 to FIG. 12.

Note that components identical to those of the first embodiment depicted in FIG. 1 to FIG. 8C are provided with the same reference numerals.

Figure 9:
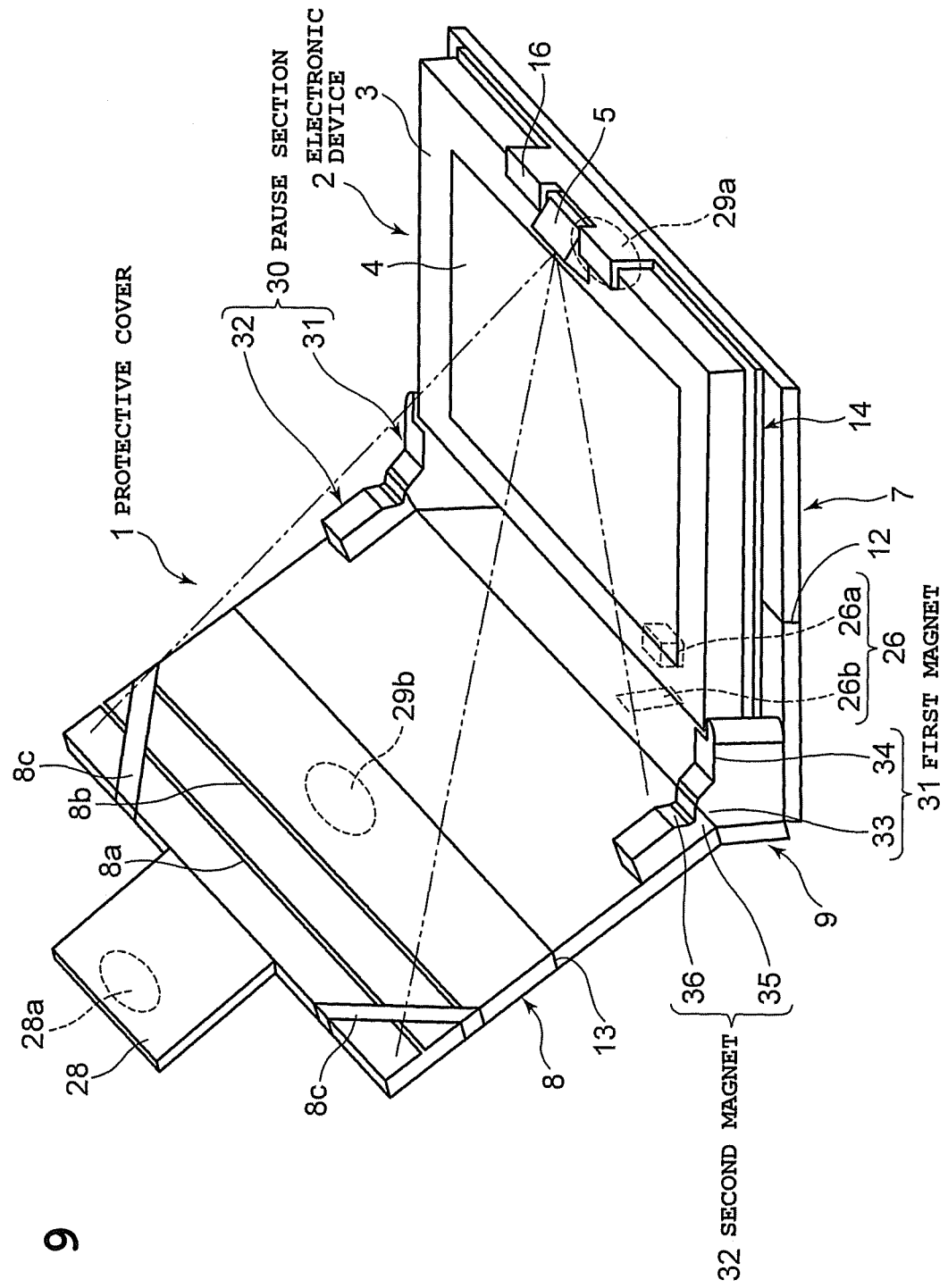
FIG. 9 is a perspective view of a second embodiment in use, in which the present invention has been applied to an electronic device.
Figure 10:
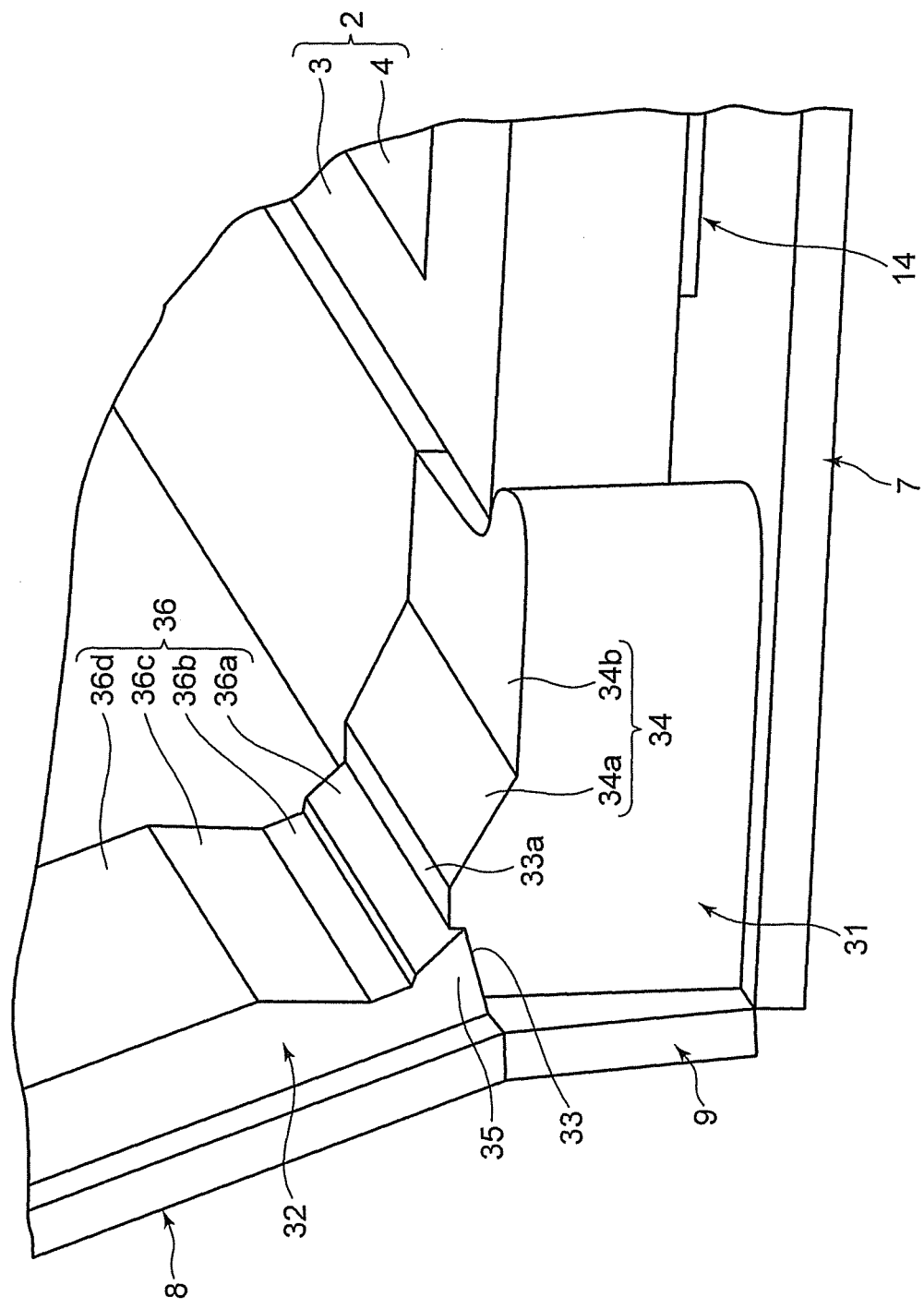
FIG. 10 is an enlarged perspective view of the main portion of a pause section of the protective cover depicted in FIG. 9.
Figure 11:
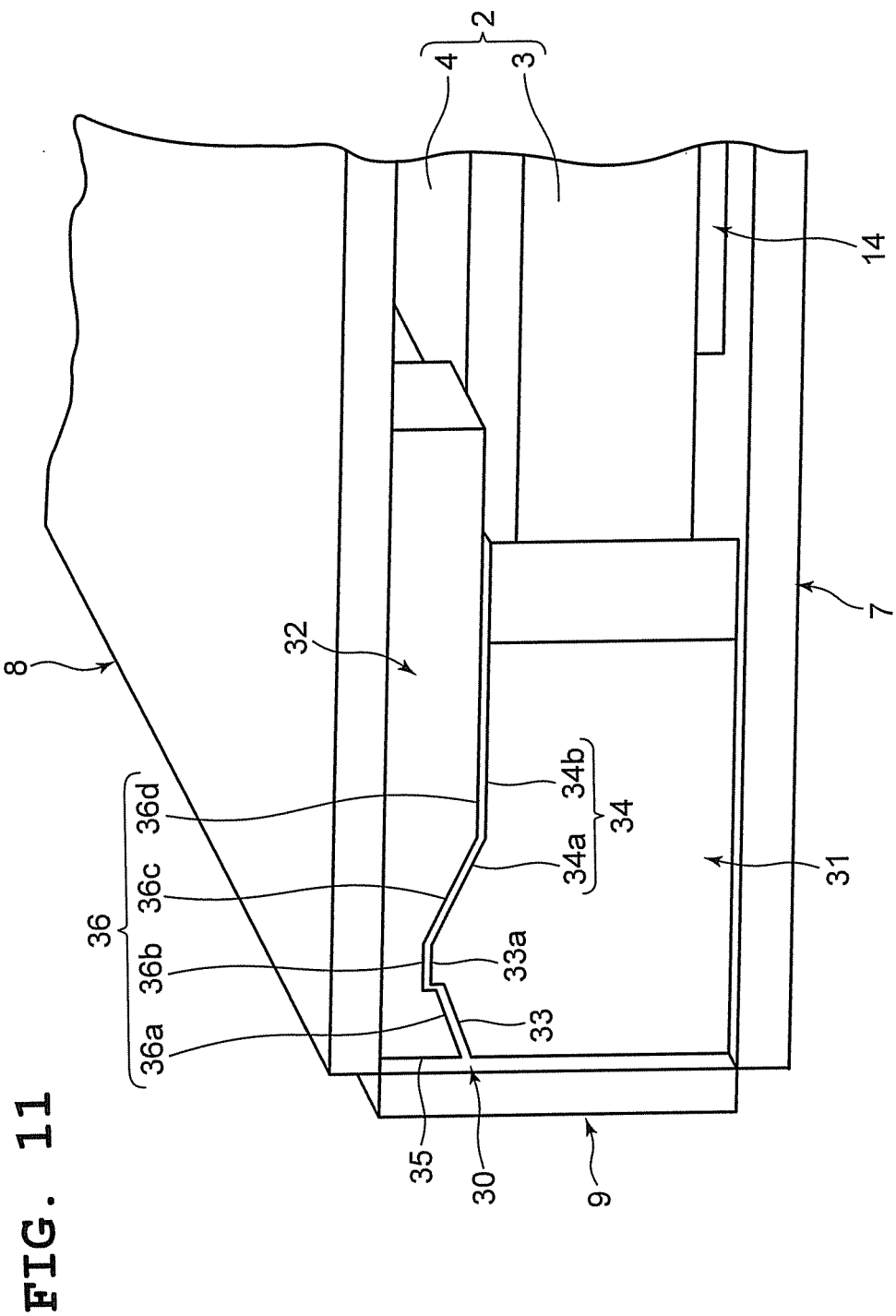
FIG. 11 is an enlarged perspective view of the main portion of the pause section when the front surface of the device case is covered and closed by a second flat section of the protective cover depicted in FIG. 10.

As depicted in FIG. 9 to FIG. 11, the electronic device 2 includes a pause section 30 structured differently from the first embodiment. Except for this point, the electronic device 2 is approximately identical in structure to that of the first embodiment.

That is, as depicted in FIG. 9 to FIG. 11, the pause section 30 is structured to include a first magnet 31 provided to the first flat section 7 positioned on one side portion of the coupling section 9 of the protective cover 1 and a second magnet 32 provided to the second flat section 8 positioned on the other side portion of the coupling section 9. By the first magnet 31 and the second magnet 32 being attached to each other by magnetic force, the second flat section 8 is protected in a predetermined state with respect to the first flat section 7.

In this case, the first flat section 7 and the coupling section 9 are coupled together via the cover sheet 11 covering the intermediate plate 10 of the first flat section 7 and the intermediate plate 10 of the coupling section 9. By this cover sheet 11 being folded, the first flat section 7 and the coupling section 9 can be freely folded.

Also, the second flat section 8 and the coupling section 9 are coupled together via the cover sheet 11 covering the intermediate plate 10 of the second flat section 8 and the intermediate plate 10 of the coupling section 9. By this cover sheet 11 being folded, the second flat section 8 and the coupling section 9 can be freely folded.

The first magnet 31 of the pause section 30 includes a first tilt section 33 for tilting and holding the second flat section 8 at the predetermined angle θ with respect to the first flat section 7, and a second tilt section 34 which positionally regulates the second flat section 8 when the second flat section 8 covers and closes the front surface 3a of the device case 3, as depicted in FIG. 9 to FIG. 11.

In this case, the thickness of the first magnet 31 is formed to have a height lower than the width of the coupling section 9, or in other words, a height approximately equal to the thickness of the device case 3, as depicted in FIG. 9 to FIG. 11.

The first tilt section 33 of the first magnet 31 is formed to be tilted upward to the right from the end of the first magnet 31 positioned on the coupling section 9 side toward the device case 3 side. On the upper portion of the first tilt section 33, a projection 33a for regulating the position of the second magnet 32 is formed.

The second tilt section 34 of the first magnet 31 includes a tilt section 34a tilted downward to the right from the upper end of the first tilt section 33 toward the device case 3 side, and a flat section 34b flatly extending from the tilt section 34a toward the device case 3 side, as depicted in FIG. 9 to FIG. 11. The tilt section 34a and the flat section 34b are formed in a row on the upper portion of the first magnet 31.

On the other hand, the second magnet 32 includes a third tilt section 35 for tilting and holding the second flat section 8 at the predetermined angle θ with respect to the first flat section 7 by being attached to the first tilt section 33 of the first magnet 31, and a fourth tilt section 36 which positionally regulates the second flat section 8 by being attached to the second tilt section 34 of the first magnet 31 when the second flat section 8 covers and closes the front surface 3a of the device case 3, as depicted in FIG. 9 to FIG. 11.

In this case, as depicted in FIG. 9 to FIG. 11, the second magnet 32 is formed to have a thin thickness so that, when the second flat section 8 covers the front surface 3a of the device case 3 and overlaps with the first magnet 31, both thicknesses are slightly higher than the width of the coupling section 9, or in other words, the thickness of the device case 3.

The third tilt section 35 of the second magnet 32 is an end face of the second magnet 32 positioned on the coupling section 9 side, and is structured to tilt and hold the second flat section 8 at the predetermined angle θ with respect to the first flat section 7 when it is attached onto the first tilt section 33 of the first magnet 31.

The fourth tilt section 36 of the second magnet 32 includes a rising tilt section 36a tilted upward to the right from the upper end of the third tilt section 35 toward the side opposite to the coupling section 9, a groove section 36b positioned on the upper portion of the rising tilt section 36a, a falling tilt section 36c tilted downward to the right from the groove section 36b toward the side opposite to the coupling section 9, and a flat section 36d flatly extending from the falling tilt section 36c toward the side opposite to the coupling section 9, as depicted in FIG. 11. The rising tilt section 36a, the groove section 36b, the falling tilt section 36c, and the flat section 36d are formed in a row on the upper portion of the second magnet 32.

That is, when the second flat section 8 covers and closes the front surface 3a of the device case 3, the rising tilt section 36a corresponds to and is attached to the first tilt section 33, the groove section 36b corresponds to and is attached to the projection 33a of the first tilt section 33, the falling tilt section 36c corresponds to and is attached to the tilt section 34a of the second tilt section 34, and the flat section 36d corresponds to and is attached to the flat section 34b of the second tilt section 34, whereby the fourth tilt section 36 regulates the position of the second magnet 32 with respect to the first magnet 31 in the front and back direction of the device case 3 (a horizontal direction in FIG. 11), as depicted in FIG. 11.

Next, the operation of the electronic device 2 is described.

First, in a case where the electronic device 2 is mounted on the protective cover 1 so as to be carried, the second flat section 8 is folded at the coupling section 9 and thereby placed on the front surface 3a of the device case 3.

Here, the protective cover 1 is folded between the first flat section 7 and the coupling section 9 and between the second flat section 8 and the coupling section 9, whereby the closing movement of the second flat section 8 is paused by the pause section 30, and the second flat section 8 is held with the second flat section 8 being tilted at the predetermined angle θ with respect to the first flat section 7.

That is, when the protective cover 1 is folded between the first flat section 7 and the coupling section 9 and between the second flat section 8 and the coupling section 9, the second magnet 32 of the second flat section 8 serving as the pause section 30 is brought closer to the first magnet 31 of the first flat section 7, and the third tilt section 35 of the second magnet 32 corresponds to and is attached to the first tilt section 33 of the first magnet 31, whereby the second flat section 8 is held at the predetermined angle θ with respect to the first flat section 7.

Here, a corner of the third tilt section 35 of the second magnet 32 abuts on the projection 33a on the upper portion of the first tilt section 33 of the first magnet 31 for positional regulation. Therefore, the third tilt section 35 of the second magnet 32 can be attached to a predetermined position of the first tilt section 33 of the first magnet 31, whereby the second flat section 8 can be tilted and held at the predetermined position and at the predetermined angle θ.

Then, when the second flat section 8 is rotated against the attachment force between the first magnet 31 and the second magnet 32, rotation is made with the corner of the third tilt section 35 of the second magnet 32 serving as a pivot and abutting on the projection 33a on the upper portion of the first tilt section 33 of the first magnet 31, and the fourth tilt section 36 of the second magnet 32 corresponds to the first tilt section 33 and the second tilt section 34 of the first magnet 31.

Then, when the second flat section 8 corresponds to and covers the front surface 3a of the device case 3, the rising tilt section 36a of the fourth tilt section 36 of the second magnet 32 corresponds to and is attached to the first tilt section 33, the groove section 36b of the fourth tilt section 36 corresponds to and is attached to the projection 33a of the first tilt section 33, the falling tilt section 36c of the fourth tilt section 36 corresponds to and is attached to the tilt section 34a of the second tilt section 34, and the flat section 36d of the fourth tilt section 36 corresponds to and is attached to the flat section 34b of the second tilt section 34.

As a result, the second magnet 32 is reliably and positionally regulated with respect to the first magnet 31 without a positional shift to the front and back direction of the device case 3 (horizontal direction in FIG. 11), whereby the second flat section 8 reliably corresponds to and covers the front surface 3a of the device case 3 so that the closed state is kept.

Thus, by the attachment force by the magnetic force between the first magnet 31 and the second magnet 32, the second flat section 8 is prevented from being inadvertently opened.

Next, use of the electronic device 2 protected by the protective cover 1 is described.

In this case, firstly, the second flat section 8 is opened to expose the front surface 3a of the device case 3.

Here, when the second flat section 8 is rotated against the attachment force by the magnetic force between the first magnet 31 and the second magnet 32 of the pause section 30, the second magnet 32 rotates with respect to the first magnet 31 with the corner of the third tilt section 35 of the second magnet 32 as a pivot.

Then, the portion between the second flat section 8 and the coupling section 9 is folded, and thereby the second flat section 8 is rotated and opened.

Then, the portion between the first flat section 7 and the coupling section 9 is folded. As a result, the second flat section 8 is rotated by 180 degrees and opened to be in a developed state, whereby the input display section 4 of the device case 3 is exposed.

In this state, by the input display section 4 being touched while information displayed thereon being viewed, display contents can be switched and other information can be inputted.

Here, in a case where the electronic device 2 is operated by being held with one hand, either one of the portion between the first flat section 7 and the coupling section 9 and the portion between the second flat section 8 and the coupling section 9 is folded to further rotate the second flat section 8 by 180 degrees and overlaps it with the lower surface of the first flat section 7.

In this state, the device case 3 and the second flat section 8 are held with one hand to be pinched, and the input display section 4 of the device case 3 is touched, whereby the electronic device 2 can be favorably used.

Figure 12:
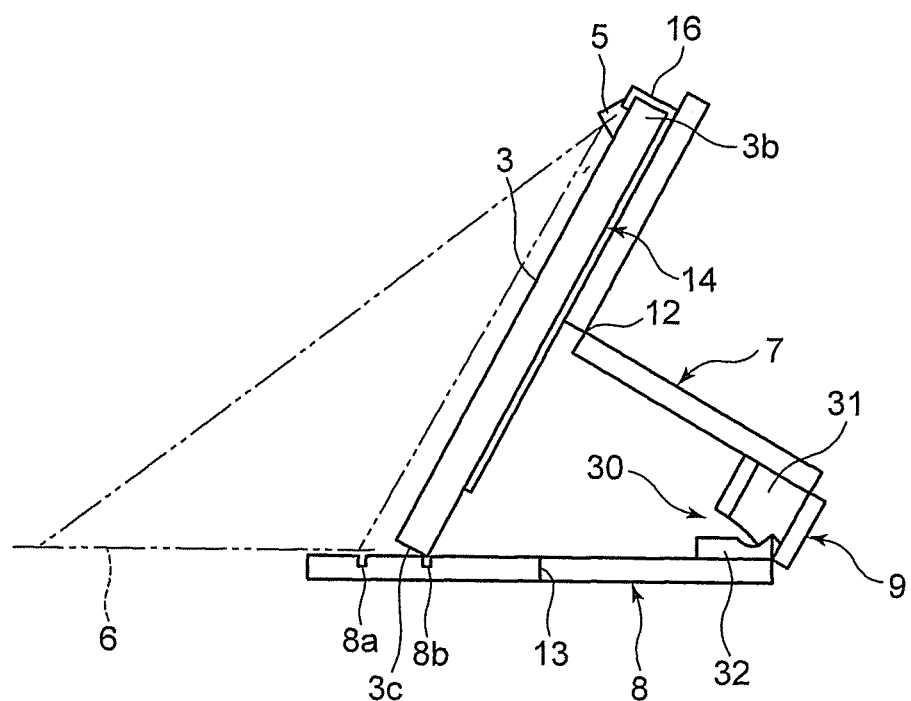
FIG. 12 is a side view depicting the state in which the electronic device is used by being leaned against the protective cover depicted in FIG. 9.

In a case where the electronic device 2 is leaned against the protective cover 1 to be used, the protective cover 1 is first unfolded and developed on a plane. Then, in this state, the portion between the first flat section 7 and the coupling section 9 is folded to rotate the first flat section 7 with respect to the second flat section 8 and cause the first flat section 7 to stand upright, as depicted in FIG. 12.

Here, the first tilt section 33 of the first magnet 31 corresponds to and is attached to the rising tilt section 36a of the fourth tilt section 36 of the second magnet 32, and the projection 33a of the first tilt section 33 of the first magnet 31 corresponds to and is attached to the groove section 36b of the fourth tilt section 36 of the second magnet 32.

As a result, by the attachment force by the magnetic force between the first magnet 31 and the second magnet 32, the first flat section 7 can be held upright with respect to the second flat section 8.

Then, the standing first flat section 7 is folded at the first folding section 12 to project toward the rear of the device case 3.

Then, the imaging section 5 of the device case 3 is positioned above, and the side surface portion 3c below the device case 3 positioned opposite thereto is placed on the second flat section 8. In this state, the device case 3 is tilted to be leaned against the protective cover 1.

Here, the edge of the side surface portion 3c positioned below the device case 3 is engaged with either one of the first position regulating groove 8a and the second position regulating groove 8b provided on the second flat section 8 selectively, whereby the tilt angle of the device case 3 is adjusted, as in the case of the first embodiment.

For example, when the edge of the side surface portion 3c positioned below the device case 3 is engaged with the first position regulating groove 8a of the second flat section 8, the tilt of the device case 3 is slight.

When the edge of the side surface portion 3c positioned below the device case 3 is engaged with the second position regulating groove 8b of the second flat section 8, the tilt of the device case 3 is steep.

Moreover, when the edge of the side surface portion 3c positioned below the device case 3 is placed on the upper surface of the second flat section 8 positioned on the coupling section 9 side of the second position regulating groove 8b, the device case 3 is leaned at a steeper angle.

In a case where a memo is required to be written on a recording paper sheet such as a writing paper sheet as the subject 6 while the electronic device 2 is being held with one hand, the second flat section 8 is folded at the second folding section 13 with the device case 3 being covered and protected by the protective cover 1, as with the first embodiment.

Then, the second flat section 8 is folded into two, and the folded portions are overlapped with each other. In this state, the electronic device 2 is held with one hand together with the protective cover 1, and the recording paper sheet such as a writing paper sheet is placed on the uppermost surface of the overlapping portions of the second flat section 8. As a result, a memo can be written.

Also, in a case where a touch operation is required to be performed on the input display section 4 while a recording paper sheet containing a memo is being viewed, the protective cover 1 is once unfolded and developed on a plane. In this state, the portion between the first flat section 7 and the coupling section 9 is folded to rotate the first flat section 7, the first flat section 7 is folded at the first folding section 12 downward relative to the device case 3, and the folded portions are overlapped with each other, as in the case of the first embodiment.

Then, since the second flat section 8 is overlapped below the device case 3, a recording paper sheet is interposed between the second flat section 8 and a half of the first flat section 7 folded and positioned below, and partially projected from the device case 3, as in the case of the first embodiment. Accordingly, a touch operation can be performed on the input display section 4 of the device case 3 while the memo written in the projected recording paper sheet is being viewed.

Next, imaging of the subject 6, such as a memo or a business card recorded on a recording paper sheet, by the imaging section 5 is described.

Firstly, in a state where the device case 3 is mounted on the device mount plate 14 on the first flat section 7 of the protective cover 1, the electronic device 2 is set at an imaging mode so that imaging by the imaging section 5 can be performed.

Then, the protective cover 1 is unfolded and developed on a plane, and the subject 6 is placed on the second flat section 8 of the developed protective cover 1. Here, the subject 6 is fixed by being inserted below the corner bands 8c of the second flat section 8.

In this state, as depicted in FIG. 9, the portion between the first flat section 7 and the coupling section 9 and the portion between the second flat section 8 and the coupling section 9 are folded to tilt the second flat section 8 together with the coupling section 9 toward the front surface 3a of the device case 3.

Then, the second magnet 32 of the second flat section 8 as the pause section 30 is brought closer to the first magnet 31 of the first flat section 7, and the third tilt section 35 of the second magnet 32 corresponds to and is attached to the first tilt section 33 of the first magnet 31 to hold the second flat section 8 with it tilted at the predetermined angle θ with respect to the first flat section 7.

Here, the corner of the third tilt section 35 of the second magnet 32 abuts on the projection 33a positioned on the upper portion of the first tilt section 33 of the first magnet 31 for positional regulation. Therefore, the third tilt section 35 of the second magnet 32 can be attached to the predetermined position of the first tilt section 33 of the first magnet 31, whereby the second flat section 8 can be tilted and held at the predetermined position and at the predetermined angle θ.

Then, the open/close detecting section 26 detects an open/close angle of the second flat section 8. That is, in the open/close detecting section 26, when second flat section 8 is tilted to the predetermined angle θ with respect to the first flat section 7, the detection target section 26b that is the magnet provided in the protective cover 1 is brought closer to the detection element 26a that is the magnetic sensor such as a Hall element provided in the device case 3, and the detection element 26a detects a magnetic field of the detection target section 26b and outputs an electric signal for causing the imaging section 5 to perform imaging. As a result, the subject 6 such as a recording paper sheet containing a memo or a business card is imaged by the imaging section 5.

Note that the present invention is not limited thereto, and the subject 6 can be imaged even when, for example, the electronic device 2 is leaned against the protective cover 1.

In this case, as depicted in FIG. 12, the portion between the second flat section 8 and the coupling section 9 is folded to rotate the first flat section 7 and cause the first flat section 7 to stand upright.

Here, the first tilt section 33 of the first magnet 31 corresponds to and is attached to the rising tilt section 36a of the fourth tilt section 36 of the second magnet 32, and the projection 33a of the first tilt section 33 of the first magnet 31 corresponds to and is attached to the groove section 36b of the fourth tilt section 36 of the second magnet 32.

As a result, by the attachment force by the magnetic force between the first magnet 31 and the second magnet 32, the first flat section 7 can be held upright with respect to the second flat section 8.

By folding this standing first flat section 7 at the first folding section 12 to project toward the rear of the device case 3, the device case 3 is tilted against the protective cover 1, as depicted in FIG. 12.

In this state, the subject 6 such as a recording paper sheet containing a memo or a business card is placed in front of the electronic device 2, and a switch for imaging (not shown) is turned ON. As a result, the subject 6 can be imaged by the imaging section 5.

As such, the electronic device 2 of the second embodiment includes the open/close detecting section 26 which detects an open/close angle of the protective cover 1 when the protective cover 1 covers the device case 3, and outputs a detection signal for causing the imaging section 5 to perform imaging, as with the first embodiment. As a result of this structure, imaging timing of the imaging section 5 can be kept constant and whereby imaging can be accurately and favorably performed.

That is, in the electronic device 2 of the second embodiment as well, an open/close angle of the protective cover 1 can be detected by the open/close detecting section 26 when the protective cover 1 covers the device case 3, as with the first embodiment. Then, based on a detection signal detected by the open/close detecting section 26, imaging timing of the imaging section 5 of the device case 3 can be kept constant, whereby the subject 6 placed on the protective cover 1 covering the front surface 3a of the device case 3 can be accurately and favorably imaged.

Also, in the electronic device 2 of the second embodiment, the pause section 30 includes the first magnet 31 provided to the first flat section 7 positioned at one side portion of the coupling section 9 and the second magnet 32 provided to the second flat section 8 positioned at another side portion of the coupling section 9. When the second flat section 8 is tilted at the predetermined angle θ with respect to the first flat section 7, the first magnet 31 and the second magnet 32 attach to each other by the magnetic force, whereby the second flat section 8 is held in a state of being tilted at the predetermined angle θ with respect to the first flat section 7. As a result of this structure, imaging timing of the imaging section 5 of the device case 3 is ensured and whereby imaging is accurately and favorably performed.

That is, in the electronic device 2 of the second embodiment, the second flat section 8 can be paused by the pause section 30 at the predetermined tilt angle θ when the front surface 3a of the device case 3 placed on the first flat section 7 of the protective cover 1 is covered by the second flat section 8, as with the first embodiment. Therefore, imaging timing of the imaging section 5 of the device case 3 can be ensured. As a result of this structure, the open/close angle of the protective cover 1 can be detected by the open/close detecting section 26 with sufficient leeway, whereby the subject 6 such as a recording paper sheet or a business card placed on the second flat section 8 can be accurately and favorably imaged always in a predetermined state.

In this case, the first magnet 31 of the pause section 30 includes the first tilt section 33 for tilting and holding the second flat section 8 at the predetermined angle θ with respect to the first flat section 7 and the second tilt section 34 which positionally regulates the second flat section 8 when the second flat section 8 covers and closes the front surface 3a of the device case 3. The second magnet 32 includes the third tilt section 35 that is attached to the first tilt section 33 of the first magnet 31 and the fourth tilt section 36 that is attached to the second tilt section 34 of the first magnet 31 when the second flat section 8 covers and closes the front surface 3a of the device case 3. As a result of this structure, the second flat section 8 can be reliably and accurately paused at the predetermined tilt angle θ when the front surface 3a of the device case 3 is covered by the second flat section 8.

<Third Embodiment>

Next, a third embodiment in which the present invention has been applied to an electronic device is described with reference to FIG. 13 to FIG. 16.

Note that components identical to those of the first embodiment depicted in FIG. 1 to FIG. 8C are provided with the same reference numerals.

As depicted in FIG. 13 to FIG. 16, the electronic device 2 of the third embodiment includes a pause section 40 for pausing the opening/closing movement of the protective cover 1 and a open/close detecting section 41 for detecting an open/close angle of the protective cover 1 which are different in structure to those of the first embodiment. Except for this point, the electronic device 2 of the third embodiment is approximately identical in structure to that of the first embodiment.

In this case, the electronic device 2 includes the first flat section 7 where the back surface 3d of the electronic device 2 is placed, the second flat section 8 which openably and closably covers the front surface 3a of the electronic device 2, and the coupling section 9 which foldably couples the first flat section 7 and the second flat section 8 together, as in the case of the first embodiment.

As with the first embodiment depicted in FIG. 4A and FIG. 4B, the first flat section 7, the second flat section 8, and the coupling section 9 are each constituted by the intermediate plate 10 made of synthetic resin and the cover sheet 11 covering the intermediate plate 10.

Figure 13:
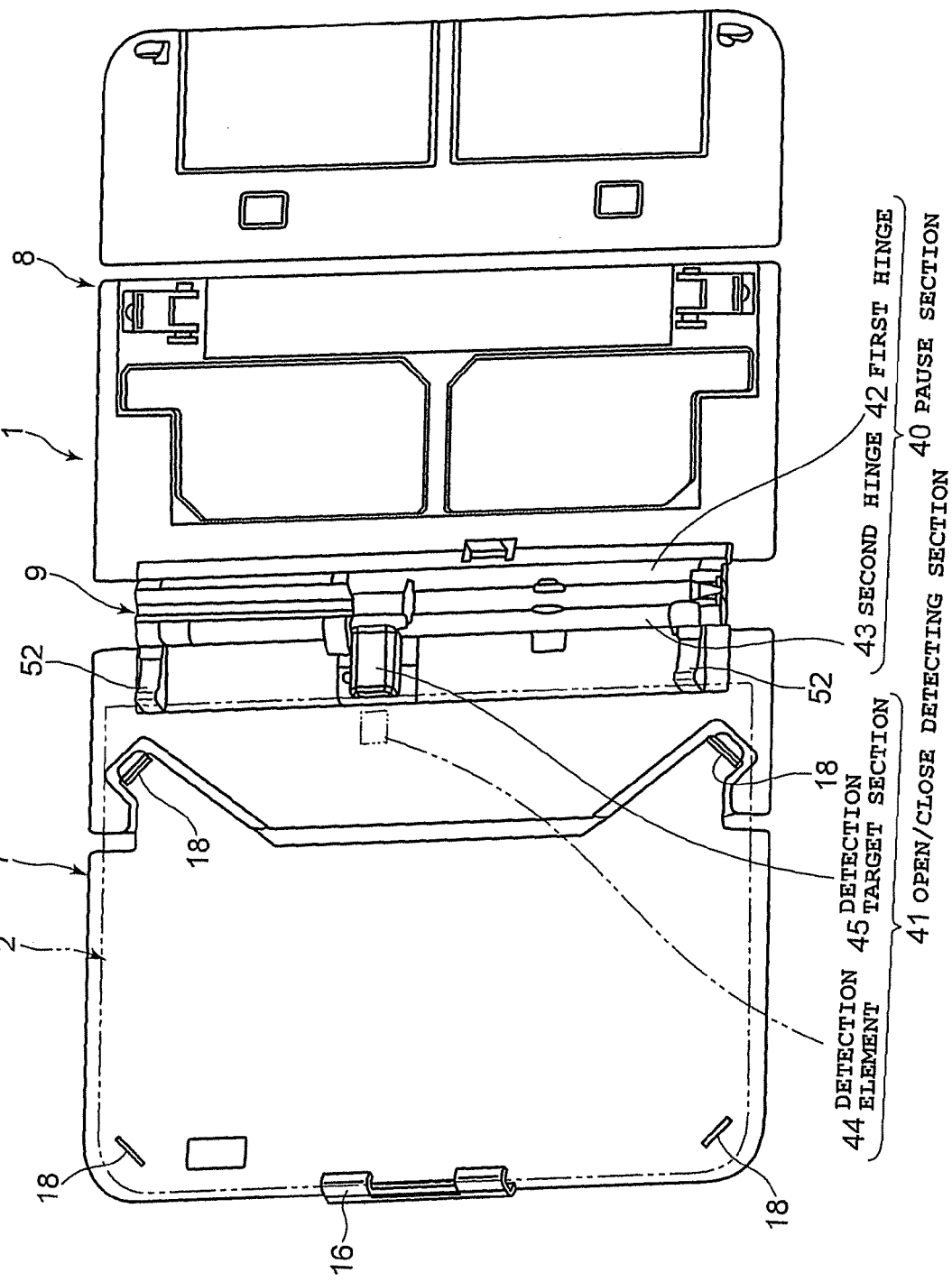
FIG. 13 is a plan view of a third embodiment where the present invention has been applied to an electronic device, which shows a state where the protective cover has been unfolded and developed.
Figure 14:
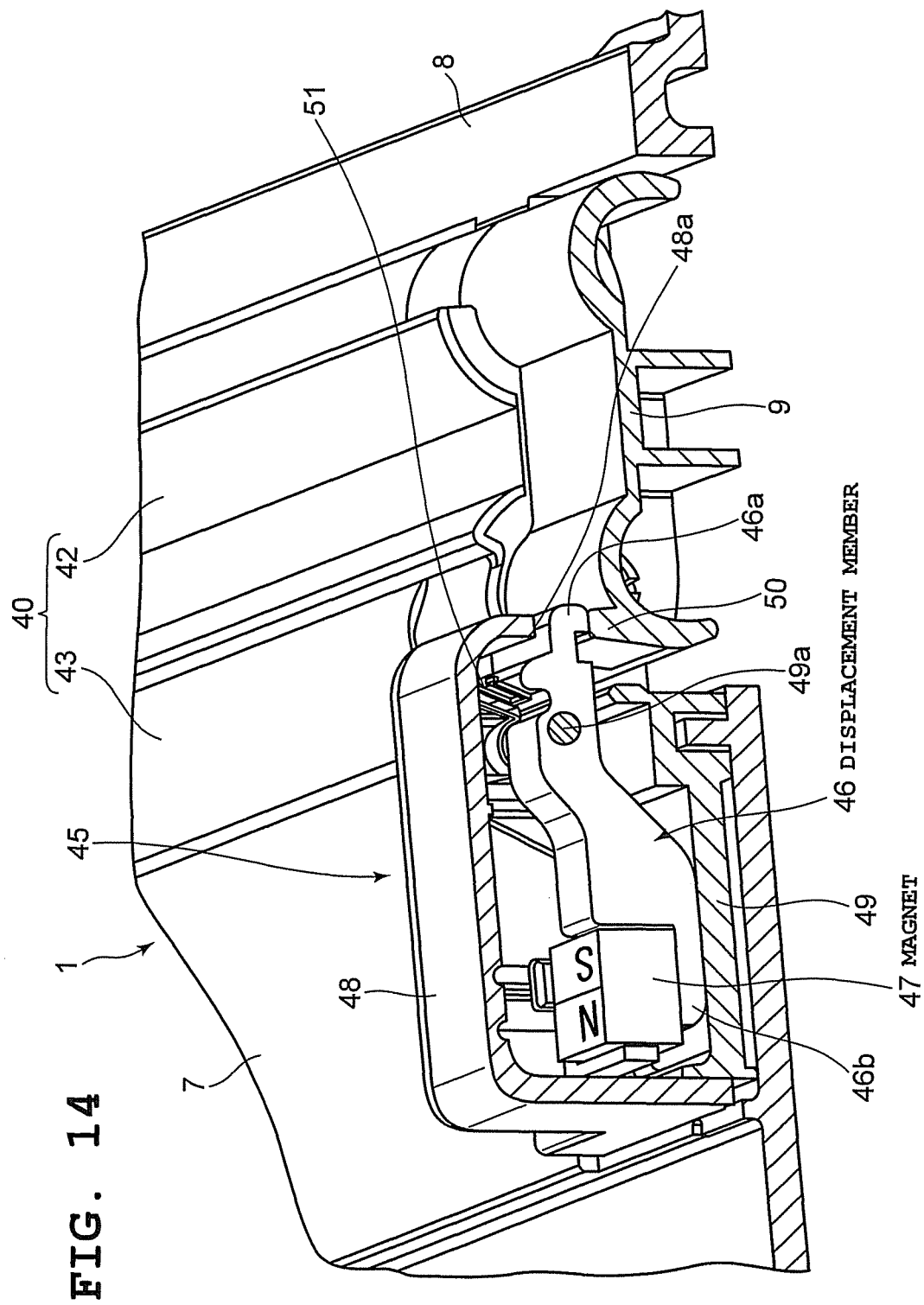
FIG. 14 is an enlarged perspective view of the main section of the third embodiment, which shows the displacement state of a magnet in a detection target section of an open/close detecting section provided to the protection cover depicted in FIG. 13 when the protective cover is unfolded and developed.
Figure 15:
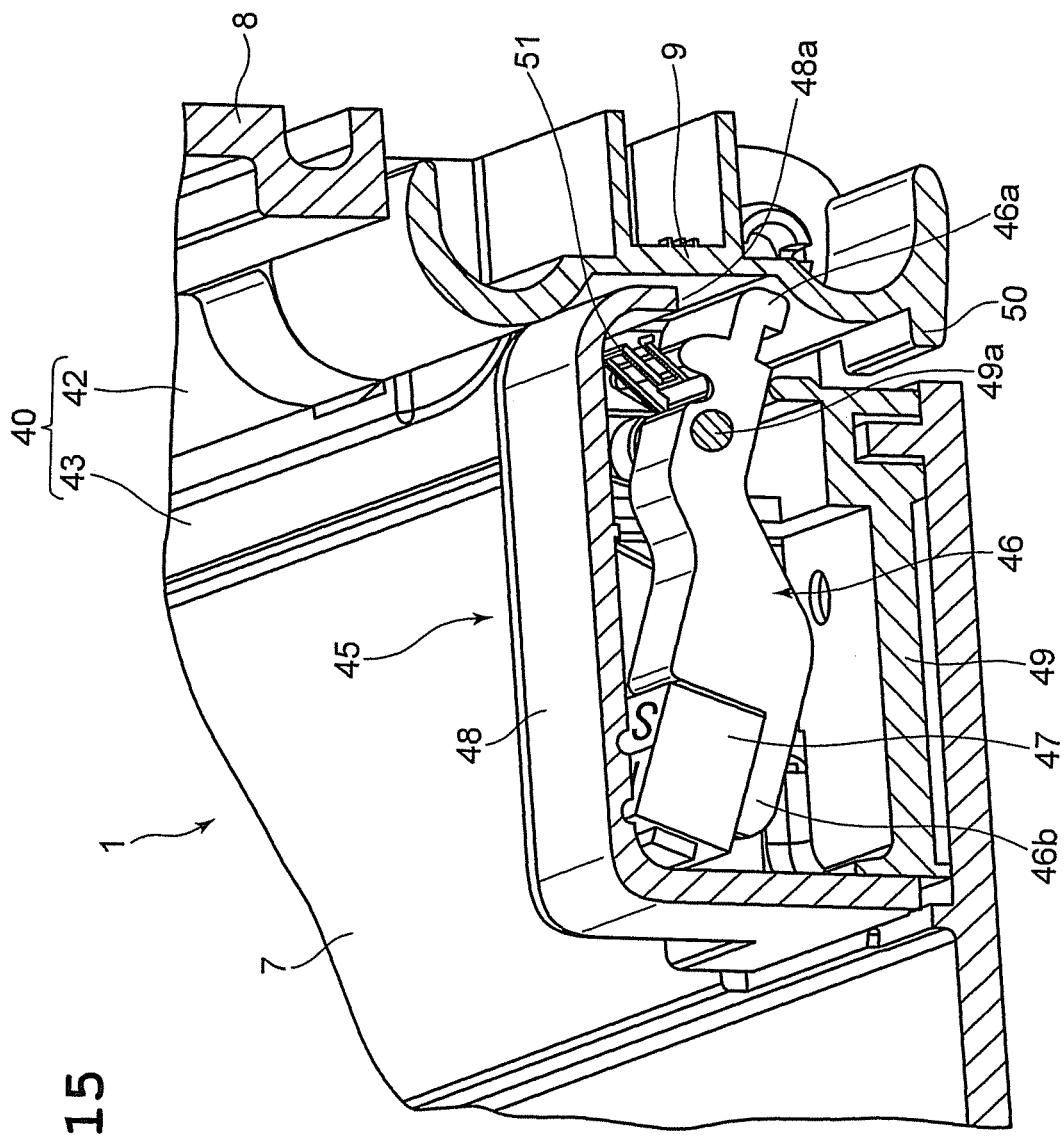
FIG. 15 is an enlarged perspective view of the main section of the third embodiment, which shows the displacement state of the magnet in the detection target section depicted in FIG. 14 when the protective cover is folded.

As depicted in FIG. 13 to FIG. 15, the protective cover 1 includes the pause section 40 which regulates a closing movement of the second flat section 8 when the second flat section 8 is tilted to the predetermined angle θ relative to the first flat section 7 for covering the front surface 3a of the electronic device 2.

Note that the predetermined angle θ of the second flat section 8 in association with the pause section 40 is, for example, in a range of 45 degrees to 90 degrees, and is preferably about 60 degrees, as in the case of the first embodiment.

As depicted in FIG. 13 to FIG. 15, the pause section 40 includes a first hinge 42 which rotates by a rotating force equal to or more than a predetermined rotating force and a second hinge 43 which rotates by a rotating force less than the predetermined rotating force. As with the first embodiment, the first hinge 42 is a torque hinge, which is mounted between the second flat section 8 and the coupling section 9.

This first hinge 42 is structured to rotate by a rotating force equal to or more than the predetermined rotating force. When the rotation forms a predetermined angle, it is paused after providing a click feeling, and then again rotates by a rotating force equal to or more than the predetermined rotating force.

The second hinge 43 is a torque hinge as in the case of the first hinge 42, which is mounted between the first flat section 7 and the coupling section 9. The second hinge 43 is structured to rotate by a rotating force less than the predetermined rotating force. When the rotation forms the predetermined angle, it is paused after providing a click feeling.

As a result of this structure of the pause section 40, when covering the surface 3a of the electronic device 2, the second flat section 8 is rotated together with the coupling section 9 about the second hinge 43 with respect to the first flat section 7, and paused at the predetermined tilt angle θ after providing a click feeling, as depicted in FIG. 13 to FIG. 15. In this state, when a rotating force equal to or more than the predetermined rotating force is applied to the first hinge 42, the coupling section 8 rotates around the second hinge 43 to abut on a cover member 48 of the open/close detecting section 41 which will be described further below. Then, the second flat section 8 is rotated around the first hinge 42 with respect to the coupling section 9, and a click feeling is provided to stop the rotation when the rotation forms the predetermined angle.

As depicted in FIG. 13 to FIG. 16, the open/close detecting section 41 is to detect an open/close angle of the protective cover 1, and includes a detection element 44 which is provided in the device case 3 of the electronic device 2 and detects a change of a magnetic field, and a detection target section 45 which is provided to the protective cover 1 and whose magnetic field is changed in accordance with an opening/closing movement of the protective cover 1. In this case, the detection element 44 is a magnetic sensor such as a magneto resistance element (MR element) which detects a change of a magnetic field, and provided in an area corresponding to the intermediate portion of the coupling section 9 of the protective cover 1 in the device case 3.

As depicted in FIG. 13 to FIG. 16, the detection target section 45 includes a displacement member 46 which is displaced according to an opening/closing movement of the protective cover 1, a magnet 47 which is provided to the displacement member 46 and whose magnetic field orientation with respect to the detection element 44 is changed by the displacement of the displacement member 46, and the cover member 48 which covers and protects the displacement member 46 and the magnet 47.

The displacement member 46 is structured to be positioned at the intermediate portion of the first flat section 7 of the protective cover 1, and arranged corresponding to the detection element 44 in the electronic device 2 mounted to the first flat section 7. In this state, the displacement member 46 rotates in a vertical direction in accordance with an opening/closing movement of the protective cover 1.

That is, as depicted in FIG. 14 and FIG. 15, the displacement member 46 is mounted on a support axis 49a of a base section 49 provided on the first flat section 7 of the protective cover 1 such that it is rotatable in the vertical direction.

In this case, the displacement member 46 is structured such that its one end 46a protrudes from an opening 48a of the cover member 48 toward the coupling section 9 of the protective cover 1, and the projecting tip separably abuts on an abut section 50 provided to the coupling section 9.

Also, as depicted in FIG. 14 and FIG. 15, the displacement member 46 is structured such that the one end 46a abuts on the abut section 50 provided to the coupling section 9 by being pressed in a push-down direction by the spring force of a spring member 51.

In this case, the abut section 50 is a projection provided to the coupling section 9. As depicted in FIG. 14, the abut section 50 is structured to abut on the one end 46a of the displacement member 46 and push up the one end 46a when the protective cover 1 is opened and developed.

Also, in the structure of the abut section 50, when the coupling section 9 is bent in the state depicted in FIG. 14 and rotates around the second hinge 43 together with the second flat section 8, the abut section 50 gradually descends with the rotation of the coupling section 9, with the one end 46a of the displacement member 46 being pushed by the spring force of the spring member 51. Then, when the second flat section 8 is opened and tilted to the predetermined angle relative to the first flat section 7, the magnet 47 of the displacement member 46 abuts on the upper inner surface of the cover member 48, whereby the abut section 50 gradually moves away from the one end 46a of the displacement member 46.

Accordingly, in the structure of the displacement member 46, when the protective cover 1 is opened and developed in a planar shape, the one end 46a is pushed up by the abut section 50 provided to the coupling section 9 of the protective cover 1, whereby the displacement member 46 rotates counterclockwise around the support axis 49a of the base section 49 against the spring force of the spring member 51, and pushes another end 46b down, as depicted in FIG. 14.

Also, in the structure of the displacement member 46, when the protective cover 1 is folded at the second hinge 43 to cause the second flat section 8 to be tilted to the predetermined angle together with the coupling section 9, the one end 46a moves together with the abut section 50 while being pushed to the abut section 50 provided to the coupling section 9 by the spring force of the spring member 51, and the displacement member 46 rotates around the support axis 49a of the base section 49 clockwise, whereby the other end 46b is gradually pushed up, as depicted in FIG. 14.

Moreover, in the structure of the displacement member 46, when the protective cover 1 is folded to cause the second flat section 8 to cover the front surface 3a of the electronic device 2, the one end 46a is pushed by the spring force of the spring member 51 to rotate around the support axis 49a of the base section 49 clockwise, and the other end 46b is pushed up to abut on the upper inner surface of the cover member 48, whereby the one end 46a moves away from the abut section 50 provided to the coupling section 9, as depicted in FIG. 15.

The other end 46b of The displacement member 46 is provided with the magnet 47 as depicted in FIG. 14 and FIG. 15. This magnet 47 is structured to have an S pole positioned on the support axis 49a side and an N pole positioned opposite thereto, in which a magnetic field is generated from the N pole to the S pole.

Figure 16:
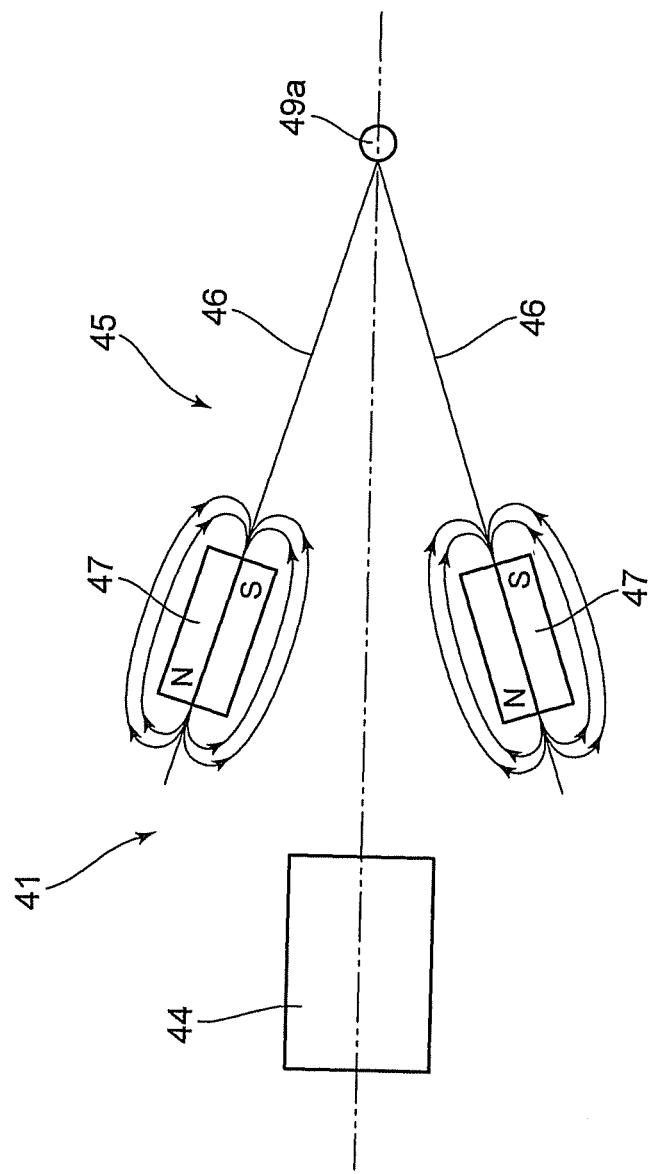
FIG. 16 is a diagram depicting the principle of the relation between the magnet of the detection target section provided to the protective cover depicted in FIG. 13 and a detection element which detects a magnetic field varied with the displacement of the magnet.

As depicted in FIG. 16, the magnet 47 is structured to, when the displacement member 46 rotates around the support axis 49a in a vertical direction, make a rotational movement in the vertical direction along with it, whereby the orientation of the magnetic field with respect to the detection element 44 is changed.

With this, the open/close detecting section 41 is structured such that, when the protective cover 1 is folded at the coupling section 9 for opening and closing, the displacement member 46 rotates around the support axis 49a in the vertical direction along with the opening/closing movement of the protective cover 1, the magnet 47 is displaced in the vertical direction along with the rotation of the displacement member 46 so as to change the orientation of the magnetic field of the magnet 47, the change of the magnetic field is detected by the detection element 44 provided in the device case 3 of the electronic device 2, and imaging of the imaging section 5 is performed based on the detection signal, as depicted in FIG. 14 to FIG. 16.

In this case, on the first flat section 7 of the protective cover 1, paired position regulating sections 52 for preventing the back surface 3d of the device case 3 of the electronic device 2 from abutting on the detection target section 45 of the open/close detecting section 41 are provided, as depicted in FIG. 13.

That is, the paired position regulating sections 52 are provided on portions of the first flat section 7 located on both sides of the coupling section 9 of the protective cover 1 in the longitudinal direction, and project to the device case 3 side so as to be slightly higher than the side surface of the cover member 48 of the detection target section 45, that is, the side surface of the cover member 48 positioned opposite to the coupling section 9.

Next, the operation of the electronic device 2 is described.

When the electronic device 2 is to be carried, the second flat section 8 is tilted at the coupling section 9 to be placed over the front surface 3a of the device case 3, with the device case 3 being mounted on the first flat section 7 of the protective cover 1.

Here, firstly, the second flat section 8 rotates together with the coupling section 9 about the second hinge 43 of the pause section 40 with respect to the first flat section 7. Then, when the second flat section 8 is tilted to the predetermined angle θ relative to the first flat section 7, the closing movement of the second flat section 8 is paused by the second hinge 43 while providing a click feeling.

Then, when the second flat section 8 is rotated by a rotating force equal to or more than the predetermined rotating force, the second hinge 43 again rotates to cause the coupling section 9 to abut on the side surface of the cover member 48 of the open/close detecting section 41, and the second flat section 8, this time, rotates around the first hinge 42 with respect to the coupling section 9.

As a result, the coupling section 9 corresponds to and covers the side surface portion 3c of the device case 3, and the second flat section 8 corresponds to and covers the front surface 3a of the device case 3, whereby the electronic device 2 is favorably protected by the protective cover 1 for carriage.

Also, in a case where the subject 6 such as a memo or a business card recorded on a recording paper sheet is required to be imaged by the imaging section 5, firstly, the electronic device 2 is set at an imaging mode so that imaging by the imaging section 5 can be performed, with the device case 3 being mounted on the first flat section 7 of the protective cover 1, as in the case of the first embodiment.

Then, the protective cover 1 is unfolded and developed on a plane, and the subject 6 is placed on the second flat section 8 of the developed protective cover 1.

In this state, the second flat section 8 is rotated together with the coupling section 9 about the second hinge 43 to be tilted toward the front surface 3a of the device case 3.

Here, the second flat section 8 rotates about the second hinge 43 of the pause section 40 together with the coupling section 9. Then, when the second flat section 8 is tilted to the predetermined angle θ relative to the first flat section 7, the closing movement of the second flat section 8 is paused by the second hinge 43 while providing a click feeling.

Here, the open/close detecting section 41 detects an open/close angle of the second flat section 8. That is, when the second flat section 8 is folded together with the coupling section 9 with respect to the first flat section 7, the displacement member 46 rotates around the support axis 49a of the base section 49 clockwise, with the one end 46a of the displacement member 46 of the detection target section 45 abutting on the abut section 50 provided to the coupling section 9 by the spring force of the spring member 51, whereby the other end 46b is gradually pushed up and the other end 46b comes closer to the upper inner surface of the cover member 48.

Then, when the second flat section 8 is tilted together with the coupling section 9 to the predetermined angle θ relative to the first flat section 7, the displacement member 46 rotates around the support axis 49a of the base section 49 by the spring force of the spring member 51 to push up the other end 46b of the displacement member 46, whereby the magnet 47 abuts on the upper inner surface of the cover member 48. Here, along with the rotation of the displacement member 46, the magnet 47 makes a rotational movement upward and the orientation of the magnet 47 is changed.

Accordingly, when the second flat section 8 is tilted to the predetermined angle θ relative to the first flat section 7, the orientation of the magnet 47 with respect to the detection element 44 in the electronic device 2 is changed along with the rotation of the displacement member 46, whereby the orientation of the magnetic field of the magnet 47 is changed, as depicted in FIG. 16.

Here, the detection element 44 detects the change of the magnetic field, and outputs an electric signal for causing the imaging section 5 to perform imaging. As a result, the subject 6 such as a recording paper sheet containing a memo or a business card is imaged by the imaging section 5.

As such, in the electronic device 2 of the third embodiment, the flat-type device case 3 having the front surface 3a provided with the imaging section 5 is covered by the foldable protective cover 1. This electronic device 2 includes the open/close detecting section 41 which detects an open/close angle of the protective cover 1 when the protective cover 1 covers the device case 3, and outputs a detection signal for causing the imaging section 5 to perform imaging. As a result, imaging timing of the imaging section 5 is kept constant and whereby imaging is accurately and favorably performed.

That is, in this electronic device 2, an open/close angle of the protective cover 1 can be detected by the open/close detecting section 41 when the protective cover 1 covers the device case 3. Then, based on a detection signal detected by the open/close detecting section 41, imaging timing of the imaging section 5 of the device case 3 can be kept constant. As a result of this configuration, the subject 6 placed at a position on the protective cover 1 covering the front surface 3*a* of the device case 3 can be accurately and favorably imaged, as in the case of the first embodiment.

In this case, the open/close detecting section 41 includes the detection element 44 which is a magnetic sensor such as a magneto resistance element and provided to the device case 3, and the detection target section 45 which is provided to the protective cover 1 and whose magnetic field is changed in accordance with an opening/closing movement of the protective cover 1. Therefore, when the second flat section 8 of the protective cover 1 is tilted with respect to the first flat section 7 of the protective cover 1, the orientation of the magnetic field of the magnet 47 of the detection target section 45 provided to the protective cover 1 is changed, and the change of the magnetic field can be detected by the detection element 44 provided to the device case 3.

Since the detection element 44 can detect the change of the magnetic field in the detection target section 45 and output an electric signal for causing the imaging section 5 to perform imaging as a detection signal, imaging timing of the imaging section 5 of the device case 3 can be kept constant based on the detection signal detected by the detection element 44. As a result of this configuration, the subject 6 placed on the second flat section 8 of the protective cover 1 covering the front surface 3*a* of the device case 3 can be accurately and favorably imaged.

That is, the detection target section 45 of the open/close detecting section 41 includes the displacement member 46 which is displaced in accordance with an opening/closing movement of the protective cover 1, and the magnet 47 which is provided to the displacement member 46 and whose magnetic field orientation with respect to the detection element 44 changes by the displacement of the displacement member 46. Therefore, when the protective cover 1 is folded at the coupling section 9 for opening and closing, the displacement member 46 rotates in the vertical direction about the support axis 49*a* in accordance with the opening/closing movement of the protective cover 1, and the magnet 47 makes a rotational movement in the vertical direction along with the rotation of the displacement member 46, whereby the orientation of the magnetic field of the magnet 47 with respect to the detection element 44 is reliably and favorably changed.

Also, in the electronic device 2, the protective cover 1, which foldably covers the flat-type electronic device 2 having the front surface 3*a* provided with the imaging section 5, includes the first flat section 7 where the back surface 3*d* of the electronic device 2 is placed, the second flat section 8 which openably and closably covers the front surface 3*a* of the electronic device 2, the coupling section 9 which foldably couples the first flat section 7 and the second flat section 8 together, and the pause section 40 which pauses a closing movement of the second flat section 8 when the second flat section 8 is tilted to the predetermined angle θ relative to the first flat section 7. As a result of this structure, imaging timing of the imaging section 5 of the device case 3 is ensured and whereby imaging is accurately and favorably performed, as with the first embodiment.

That is, in the electronic device 2, the second flat section 8 can be paused by the pause section 40 at the predetermined tilt angle θ when the front surface 3*a* of the electronic device 2 placed on the first flat section 7 is covered by the second flat section 8. As a result of this structure, imaging timing of the imaging section 5 of the device case 3 can be ensured, whereby the open/close state of the protective cover 1 can be accurately detected by the open/close detecting section 41 with sufficient leeway, and the subject 6 such as a recording paper sheet or a business card placed on the second flat section 8 can be accurately and favorably imaged always in a predetermined state.

In this case, the pause section 40 includes the first hinge 42 which rotates by a rotating force equal to or more than a predetermined rotating force and the second hinge 43 which rotates by a rotating force less than the predetermined rotating force. Accordingly, when covering the front surface 3*a* of the electronic device 2, the second flat section 8 is rotated around the second hinge 43 with respect to the first flat section 7, paused at the predetermined tilt angle θ, and then rotated around the first hinge 42 with respect to the first flat section 7.

That is, by the first hinge 42 being mounted on the second flat section 8 and the coupling section 9, and the second hinge 43 being mounted on the first flat section 7 and the coupling section 9, when covering the front surface 3*a* of the electronic device 2, the second flat section 8 rotates with the coupling section 9 with respect to the first flat section 7 around the second hinge 43 which rotates by the rotating force less than the predetermined rotating force. Then, when the second flat section 8 is tilted to the predetermined angle θ relative to the first flat section 7, the pause section 40 can pause the rotation of the second flat section 8 and the coupling section 9 while providing a click feeling.

Also, when the second flat section 8 is tilted to the predetermined angle θ relative to the first flat section 7, and the second flat section 8 is rotated by a rotating force equal to or more than the predetermined rotating force, the coupling section 9 abuts on the side surface of the cover member 48 of the open/close detecting section 41, and the second flat section 8 is, this time, rotated with respect to the coupling section 9 about the first hinge 42. Accordingly, it is possible to cover the side surface portion 3*c* of the device case 3 with the coupling section 9 corresponding to the side surface portion 3*c* of the device case 3, and also cover the front surface 3*a* of the device case 3 with the second flat section 8 corresponding to the front surface 3*a* of the device case 3.

In each of the first to third embodiments, the detection element 26*a* of the open/close detecting section 26, 41 is a magnetic sensor, and the detection target section 26*b*, 45 has a magnet. However, the present invention is not limited thereto. For example, an optical sensor may be used in which the detection element is constituted by a light-emitting element and a light-receiving element, and the detection target section is constituted by a reflecting section. In this case, the optical sensor detects an open/close angle of the protective cover 1 by reflecting light from the light-emitting element of the detection element at the reflecting section of the detection target section and receiving the reflected light at the light-receiving element of the detection element.

Also, the open/close detecting section is not limited to those described above. For example, a mechanical switch section may be used in which the detection element is constituted by a micro switch and the detection target section which pushes the micro switch serving as the detection element is constituted by a part of the coupling section 9. By using this mechanical switch section as an open/close detecting section, the structure can be simplified, and the cost can be reduced.

Moreover, in each of the first and second embodiments, the present invention is applied to a tablet terminal device as the electronic device 2. However, the present invention is not limited thereto, and may be applied to a flat-type electronic device having a keyboard section and a display section arranged on a plane. In this case as well, the electronic device may be any device as long as it is structured to include the imaging section 5 on the front surface.

While the present invention has been described with reference to the preferred embodiments, it is intended that the invention be not limited by any of the details of the description therein but includes all the embodiments which fall within the scope of the appended claims.

What is claimed is:

1. An electronic device having a flat-type device case whose front surface is provided with an imaging section and which is covered by a cover that is foldable, comprising:

an open/close detecting section which, while a subject is attached to an interior surface of the cover that faces the imaging section and the cover at least partially covers the device case, detects that an open/close angle of the cover has reached a predetermined angle via a closing direction from a previous open position is suitable for capturing a subject by the imaging section, and outputs in response to detecting the cover has reached the predetermined angle a detection signal to the imaging section for initiating the imaging section to perform imaging, and, while the cover is opened to expose an interior of the front surface of the device case, does not output the detection signal to the imaging section when the detected open/close angle of the cover has reached the predetermined angle, wherein the detection signal corresponds to the detected open/close angle of the cover and the imaging section images the subject in accordance with the detection signal.

2. The electronic device according to claim 1, wherein the open/close detecting section includes a detection element which is provided to the device case, and a detection target section which is provided to the cover and capable of moving toward or away from the device case in accordance with an opening/closing movement of the cover.

3. The electronic device according to claim 2, wherein the detection element is a magnetic sensor which detects a magnetic field, and the detection target section is a magnet.

4. The electronic device according to claim 1, wherein the open/close detecting section includes a detection element which is provided to the device case and detects a change of a magnetic field, and a detection target section which is provided to the cover and whose magnetic field is changed in accordance with an opening/closing movement of the cover.

5. The electronic device according to claim 4, wherein the detection element is a magnetic sensor which detects a change of a magnetic field, and the detection target section includes a displacement member which is displaced in accordance with the opening/closing movement of the cover, and a magnet which is provided to the displacement member and whose magnetic field orientation with respect to the detection element is changed in accordance with a displacement of the displacement member.

6. The electronic device according to claim 1, wherein the cover has a folding section which corresponds to a side surface portion of the device case and is provided with a pen holder section, and the penholder section is provided with a detection target section of the open/close detecting section.

7. An electronic device having a device case which is covered by a cover and is provided with an imaging section for imaging a subject placed on an interior surface of the cover, comprising:

an open/close detecting section which, while the cover is gradually brought close to the device case from a state where the cover is opened to expose an interior of a front surface of the device case, so as to reduce an open/close angle between the cover and the device case, detects that the open/close angle of the cover has reached a predetermined angle suitable for capturing the subject by the imaging section, wherein the subject is attached to the interior surface of the cover that faces the imaging section, and outputs in response to detecting the cover having reached the predetermined angle, a detection signal to the imaging section for initiating the imaging section to perform imaging, and, while the cover is gradually opened to expose a front surface of the device case so as to increase the open/close angle, does not output the detection signal to the imaging section when the detected open/close angle of the cover has reached the predetermined angle, wherein the detection signal corresponds to the detected open/close angle of the cover and the imaging section images the subject in accordance with the detection signal.

8. An electronic device having a device case which is covered by a cover and is provided with an imaging section for imaging a subject placed on an interior of the cover, comprising:

a pause section which, while the cover covers the device case, pauses a closing movement of the cover when the cover is tilted to a predetermined angle with respect to the device case;

an open/close detecting section which, while the cover is gradually brought close to the device case from a state where the cover is opened to expose an interior of a front surface of the device case, so as to reduce an open/close angle between the cover and the device case, detects that the open/close angle of the cover has reached the predetermined angle suitable for capturing the subject attached to the interior surface of the cover that faces the imaging section by the imaging section and outputs in response to detecting the cover has reached the predetermined angle, a detection signal to the imaging section for initiating the imaging section to perform imaging, wherein the detection signal corresponds to the detected open/close angle of the cover and the imaging section images the subject in accordance with the detection signal.

9. The electronic device according to claim 8, wherein the pause section includes a first hinge which rotates by a rotating force equal to or more than a predetermined rotating force and a second hinge which rotates by a rotating force less than the predetermined rotating force.

10. The electronic device according to claim 9, wherein, while the cover covers the device case, the pause section rotates the cover about the second hinge and pauses the cover at the predetermined angle, and then rotates the cover about the first hinge.

11. The electronic device according to claim 8, wherein the pause section comprises a click-feeling providing section which provides a click-feeling to the cover when the cover is paused at the predetermined angle.

* * * * *